(12) United States Patent
Burns et al.

(10) Patent No.: US 9,182,154 B2
(45) Date of Patent: Nov. 10, 2015

(54) ADAPTIVE CONTROL OF VAPOR COMPRESSION SYSTEM

(75) Inventors: Dan Burns, Arlington, MA (US); Christopher Laughman, Waltham, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 853 days.

(21) Appl. No.: 13/354,725

(22) Filed: Jan. 20, 2012

(65) Prior Publication Data

US 2013/0186119 A1 Jul. 25, 2013

(51) Int. Cl.
*G05D 23/19* (2006.01)
*F25B 49/02* (2006.01)
*F25B 1/00* (2006.01)

(52) U.S. Cl.
CPC . *F25B 1/00* (2013.01); *F25B 49/02* (2013.01); *G05D 23/1917* (2013.01)

(58) Field of Classification Search
CPC .......................... F25B 49/02; G05D 23/1917
USPC ............. 62/126, 132, 157, 231; 700/31, 275, 700/276, 300
See application file for complete search history.

(56) References Cited

U.S. PATENT DOCUMENTS

| 4,608,833 | A  | * | 9/1986  | Kountz ...................... 62/228.1 |
| 8,463,441 | B2 | * | 6/2013  | Zugibe et al. ................ 700/275 |
| 2008/0104985 | A1 | * | 5/2008  | Carlsen ...................... 62/228.4 |
| 2010/0106331 | A1 | * | 4/2010  | Li et al. ..................... 700/277 |
| 2011/0276180 | A1 | * | 11/2011 | Seem ......................... 700/275 |

\* cited by examiner

*Primary Examiner* — Jonathan Bradford
(74) *Attorney, Agent, or Firm* — Gene Vinokur; Dirk Brinkman

(57) ABSTRACT

A control system controls adaptively an operation of a vapor compression system. The control system includes a memory for storing a mapping relationship between control inputs of the vapor compression system, and a processor for executing a supervisory controller and an optimization controller. The supervisory controller controls the operation of the vapor compression system using a set of control inputs selected according to the mapping relationship. The optimization controller modifies the mapping relationship in response to the operation of the vapor compression system.

20 Claims, 20 Drawing Sheets

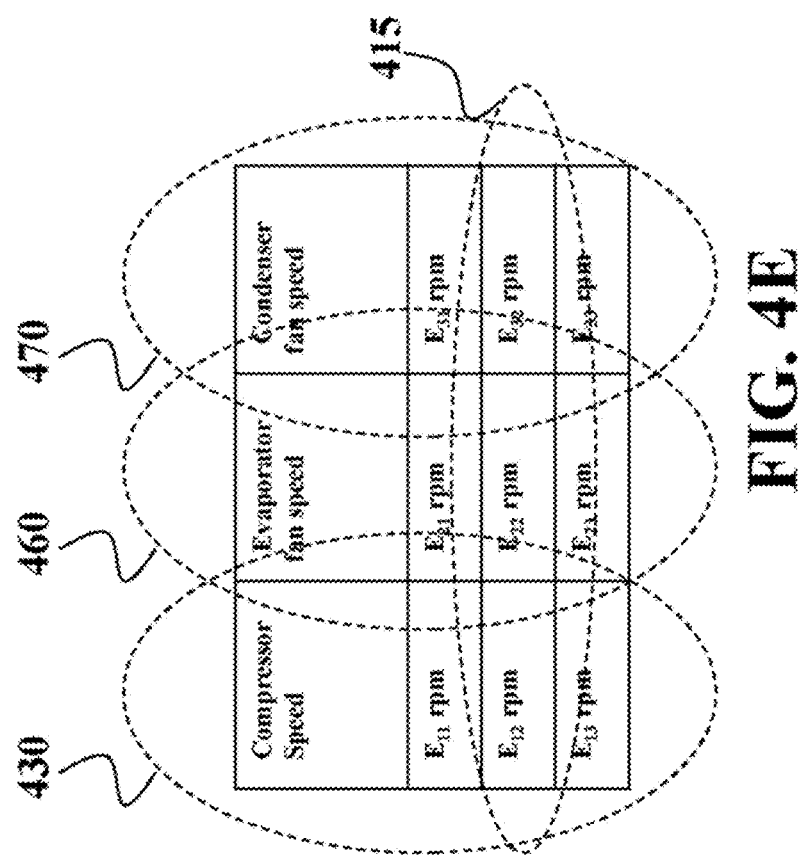

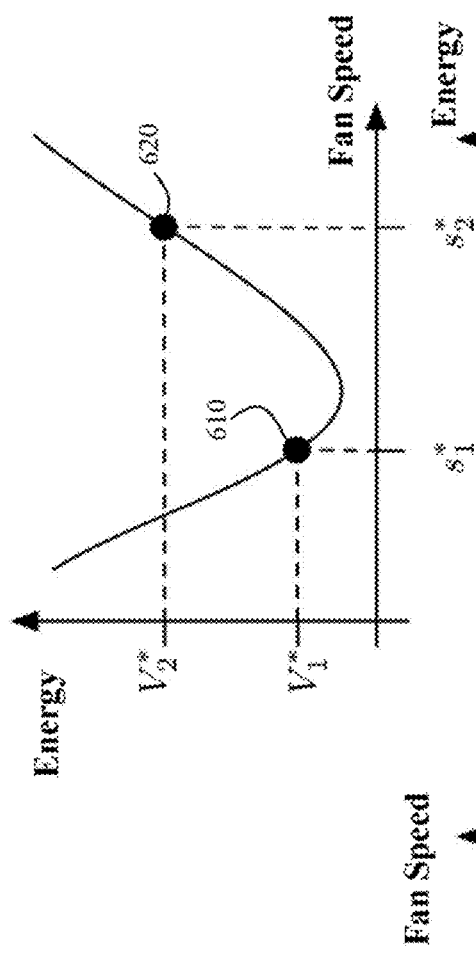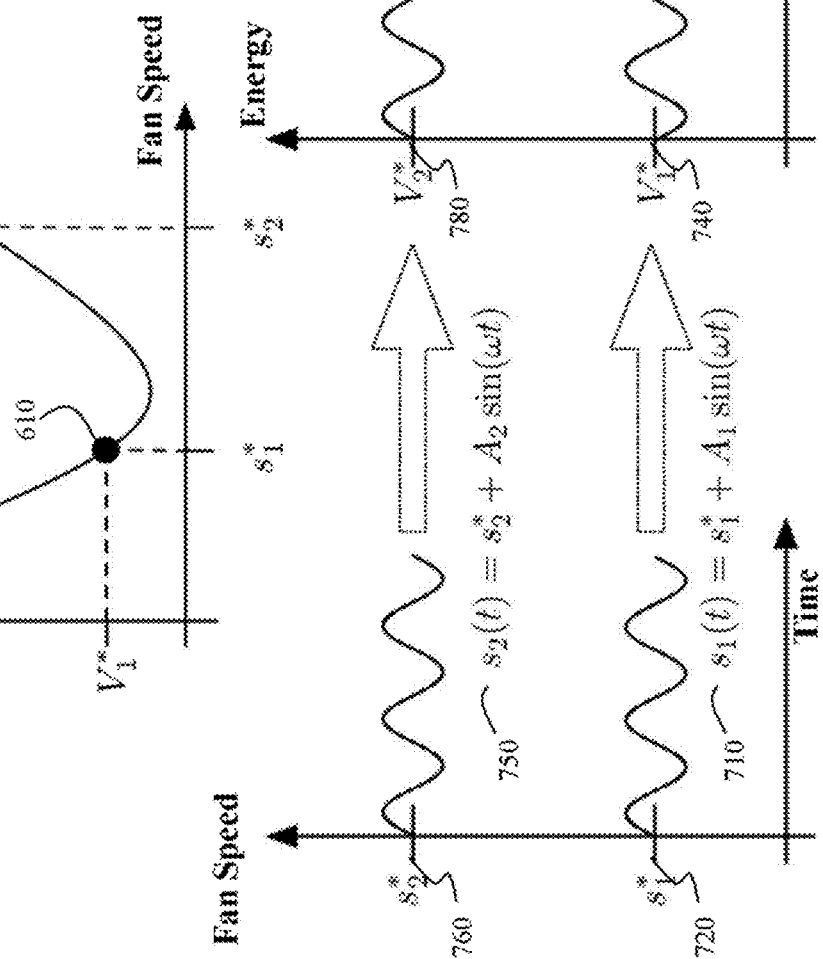
FIG. 7A
FIG. 7B
FIG. 7C

800

ADAPTIVE CONTROL OF VAPOR COMPRESSION SYSTEM

FIELD OF THE INVENTION

This invention relates generally to vapor compression systems, and more particularly to controlling operations of the vapor compression system adaptively.

BACKGROUND OF THE INVENTION

Vapor compression systems, such as heat pumps, refrigeration and air-conditioning systems, are widely used in industrial and residential applications. The introduction of adjustable actuators such as variable speed compressors, variable position valves, and variable speed fans to the vapor compression cycle has greatly improved the flexibility of the operation of such systems. It is possible to use these new components to improve the efficiency of vapor compression systems by controlling the components correctly.

An operation cycle of the vapor compression system starts by compressing the refrigerant to a high-temperature, high-pressure vapor state, after which the refrigerant flows into a condenser. Because the air flowing over the condenser coils is cooler than the refrigerant, the refrigerant cools to form a high-pressure, low-temperature liquid when exiting the condenser.

Then, the refrigerant passes through a throttling valve that decreases the pressure. The low-pressure refrigerant boils at a lower temperature, so the air passing over the evaporator coils heats the refrigerant. Thus, the air is cooled down, and the low-pressure liquid refrigerant is converted to a low-pressure vapor. This low-pressure, low-temperature vapor then enters the compressor, and the operation of the vapor compression system is continues to cycle.

The operation of the typical vapor compression system is affected by a set of environmental parameters, such as thermal load on the system as well as air temperatures at an evaporator and a condenser. Some of these environmental parameters, such as the indoor temperature, have a desired value, i.e., a setpoint, for users of the vapor compression system. For example, the setpoint can be one variable, e.g., the indoor temperature. Also, the setpoint can be a set of multiple variables, such as the temperature and relative humidity of the indoor air.

The operation of the vapor compression system is also defined by a set of thermodynamic parameters of the refrigerant, such as an evaporating pressure, the amount of superheat at the evaporator outlet, condensing pressure, and the amount of cooling at the condenser outlet. The setpoint can be provided for both the environmental and the thermodynamic parameters.

FIG. 1 shows a conventional vapor compression system 100 including an evaporator fan 114, a condenser fan 113, an expansion valve 111, and a compressor 112. The system can be controlled by a controller 120 for accepting setpoints 115, e.g., from a thermostat, and inputs from a sensor 125, and outputting a set of control signals for controlling operation of the components. The controller 120 is operatively connected to a set of control devices for transforming the set of control signals to a set of specific control inputs for corresponding components. For example, the controller is connected to a compressor control device 122, to an expansion valve control device 121, to an evaporator fan control device 124, and to a condenser fan control device 123.

The controller controls operation of the vapor compression system such that the setpoint values are achieved for a given heat load. For example, a speed of the compressor 112 can be adjusted to modulate a flow rate of a refrigerant. The speed of the evaporator fan 114 and the condenser fan 113 can be varied to alter heat transfer coefficients between air and heat exchangers. The change in the expansion valve 111 opening can directly influence a pressure drop between the high-pressure and the low-pressure in the vapor compression system, which, in turn, affects the flow rate of the refrigerant, as well as superheat at the corresponding evaporator outlet.

In most vapor compression systems, the controller 120 issues commands to various control devices such as the condenser fan control device 123, the compressor control device 122, the expansion valve control device 121, or the evaporator fan control device 124. The objective of the controller is to cause the vapor compression system to track the setpoints 115 such as a desired room temperature or superheat temperature. The controller uses information from sensors 125.

Vapor compression systems are known to consume large quantities of energy, and therefore are costly to operate. Accordingly, it is desired to determine the set of control inputs that optimizes a performance of the vapor compression system. A number of methods for controlling operations of the vapor compression system are known.

For example, one method determines optimal energy consumption by comparison of operation of the vapor compression system controlled by modulating the speed of the condenser fan. However, large changes in the cooling load might result in suboptimal energy consumption because the system does not apply sufficient adjustments to the speed to determine the optimal value of the speed.

Another method for controlling a vapor compression system considers the possibility of sudden change in the environmental or thermal load requirements, monitors the vapor compression system in real-time, and determines, based on these real-time measurements, a set of parameters to enable the system to operate at maximum coefficient of performance. However, that method is time consuming, and requires substantial real time computational resources.

Another method first determines amount of heat flow across an evaporator or a condenser. Next, the amount of heat flow is used to determine the set of optimal control inputs. As the amount of heat flow is directly related to the operation of the vapor compression system, the determination of the heat flow is difficult to avoid. However, there are applications in which it is desired to determine the optimal set of control inputs without determining the amount of heat that the vapor compression system needs to transfer in accordance with a desired setpoint.

Yet another method reduces energy consumption of cold water or hot-water in the air conditioner by measuring the room temperature, and retrieving a value of a valve opening from a valve opening table using the room temperature as an index. However, conventional vapor compression systems typically have number of different components, including but not limited to the valve, which need to be controlled concurrently. Moreover, that method determines the valve opening based on an outside environment conditions only, which are not always optimal.

Accordingly, there is a need for a control system and a method for controlling operation of the vapor compression system such that heat load of the operation is met and a performance of the system is optimized.

Also, vapor compression systems are widely deployed in many environments. Therefore it is desirable to adapt the control system to maintain optimal efficiency of the vapor compression system for various thermodynamic environments and conditions.

Furthermore, it is well known that the characteristics of the vapor compression system vary over time. The refrigerant can slowly leak out of the system, and accumulation of debris on the heat exchangers can significantly alter the heat transfer. Therefore, it is also desirable to provide such control system that optimizes the performance of the system adaptively in consideration of those changes in system behavior.

SUMMARY OF THE INVENTION

It is an object of a present invention to provide a system and a method for controlling an operation of a vapor compression system adaptively, such that a performance of the vapor compression system is optimized for variation in a performance of the system caused by specifics of installation of the system and aging of the system.

It is a further object of some embodiments of the invention to provide a control system and a method that responds rapidly to changes in disturbances of the system, such as a varying heat load, and outdoor air temperature. It is a further object of some embodiments of the invention to provide a control system and a method that minimizes relying on mathematical models of the vapor compression system that can be difficult to derive, calibrate and maintain.

Various embodiments of the invention are based on a general realization that for any heat load the combination of control inputs to the vapor compression system is often not unique, and these various combinations consume different amounts of energy. Therefore, it is desirable to operate the vapor compression system using the combination of inputs that minimizes energy and thereby maximizes efficiency.

Furthermore, it is realized that the combination of inputs minimizing the energy can be determined and stored in a memory of a control system as a mapping relationship between at least two control inputs of the vapor compression system. For example, the mapping relationship can be implemented as an approximation function, or as a lookup table storing sets of optimal control inputs. A control system that uses the mapping relationship executes quickly and efficiently on a limited computing power typically used by vapor compression systems. Accordingly, such control system results in rapid rejection of disturbances of the vapor compression system. Further, the mapping relationship can be designed to optimize the metric of performance, such as energy consumption, and, thus, the sets of control inputs selected based on the mapping relationship optimize the performance of the system.

Determining the mapping relationship, e.g., entries in the lookup table, is a critical problem in designing the control system employing principals of the invention. A model of the vapor compression system can be used to determine the mapping relationship optimizing the performance. However, the use of models for the selection of optimizing inputs has several drawbacks and is not always optimal or even desirable.

Firstly, some models rely on simplifying assumptions in order to produce a mathematically tractable representation. These assumptions often ignore important effects or do not consider installation-specific characteristics, such as room size, causing the model of the system to deviate from actual operating characteristics of the system.

Secondly, the variations in those systems during the manufacturing process are often large. This makes it difficult to produce vapor compression systems of the same type that exhibit different input-output characteristics, and therefore a single model cannot accurately describe the variations in the manufacturing process.

Thirdly, those models are complex to derive and calibrate. For example, parameters that describe the operation of a component of a vapor compression system, e.g., a compressor, can be experimentally determined for each type of the compressor used, and a model of a complete vapor compression system may have many of such parameters. Determining the values of these parameters for each model can be difficult.

Also, vapor compression systems are known to vary over time. A model that accurately describes the operation of a vapor compression system at one point in time may not be accurate later, for example, due to slowly leaking refrigerant, or the accumulation of corrosion or debris on the heat exchangers.

Therefore, it is advantageous to update or modify the mapping relationship in response to the changes in the performance of the system. An optimization controller, such as an extremum seeking controller, can be used to determine optimal sets of control inputs. This approach has the benefit of minimizing the usage, or even not requiring, a model and is adaptive to differences in system parameters at the time of manufacture or over time as a particular system ages.

For example, the optimization controller can include an extremum seeking controller that modifies the signal generated by a supervisory controller with some type of perturbation, and measures changes in the energy consumption as a result of the perturbation. In this manner, the extremum seeking controller drives the vapor compression system to use combinations of inputs that are measured to be optimal according the metric of performance. The extremum seeking controller has the important effect of achieving convergence to the optimal operating point without using a model of the thermodynamics of the vapor compression system.

Usually, however, this extremum seeking requires that the perturbation be slower than any other dynamic transient response in the system, otherwise proper convergence to the optimal operating point may not occur. Therefore, this energy optimizing controller can be too slow to be used in systems where disturbances are expected to change faster than the convergence of the optimizing controller to the optimal operating point.

Therefore, various embodiments of the invention combine the operation of the extremum seeking controller and the feedback controller. Specifically, the supervisory controller determines the set of control inputs using the mapping relationship stored in a memory, and the optimization controller modifies the mapping relationship using, e.g., extremum seeking of the metric of performance of the vapor compression system.

In such manner, the optimal combinations of control inputs are stored in the memory in an automated or semi-automated fashion and the updated mapping relationship are used during operation of the vapor compression machine. Thus, the benefits of both the high speed nature of using mapping relationship and the model-free approach for determining optimal sets of control inputs are realized.

Accordingly, one embodiment of the invention discloses a control system for controlling adaptively an operation of a vapor compression system. The control system includes a memory for storing a mapping relationship between control inputs of the vapor compression system, and a processor for executing a supervisory controller and an optimization controller. The supervisory controller controls the operation of the vapor compression system using a set of control inputs selected according to the mapping relationship. The optimization controller modifies the mapping relationship in response to the operation of the vapor compression system.

Another embodiment discloses a vapor compression system, including an evaporator having a fan for adjusting an air-flow rate through a heat exchanger, wherein the fan is variable speed fan controlled by an evaporator fan control device; a condenser having a fan for adjusting the air-flow rate through the heat exchanger, wherein the fan is variable speed fan controlled by a condenser fan control device; a compressor having a speed for compressing and pumping refrigerant through the system, wherein the speed of the compressor is variable and controlled by a compressor control device; a expansion valve for providing an adjustable pressure drop between a high-pressure portion and a low-pressure portion of the vapor compression system, wherein the expansion valve is controlled by an expansion valve control device; a supervisory controller for controlling an operation of the vapor compression system using a set of control inputs determined based on a mapping relationship between control inputs of the vapor compression system, wherein the set of control inputs includes corresponding control inputs for controlling the evaporator fan control device, the condenser fan control device, the compressor control device, and the expansion valve control device; and an extremum seeking controller for modifying the mapping relationship using extremum seeking of a metric of performance of the vapor compression system.

Yet another embodiment discloses a method for controlling an operation of a vapor compression system. The method includes determining a first control input based on the operation of the vapor compression system; selecting, based on the first control input, a second control input from a memory storing a mapping relationship between control inputs of the vapor compression system; determining a modification value optimizing a performance of the vapor compression system operated based on the first control input and the second control input; and adjusting the mapping relationship based on the modification value. Steps of the method are preformed by the processor. In one variation of this embodiment, the modification value is determined using an extremum seeking of a metric of performance of the vapor compression system.

DEFINITIONS

In describing embodiments of the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "control system" refers to a device or a set of devices to manage, command, direct or regulate the behavior of other devices or systems. The control system can be implemented by either software or hardware, and can include one or several modules. The control system, including feedback loops, can be implemented using a microprocessor. The control system can be an embedded system.

A "computer system" refers to a system having a computer, where the computer comprises computer-readable medium embodying software to operate the computer.

A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. The vapor compression systems are used in applications beyond the conditioning of residential or commercial spaces. For example, the vapor compression cycle can be used by the vapor compression system to cool computer chips in high-performance computing applications A "HVAC" system refers to any heating, ventilating, and air-conditioning (HVAC) system implementing the vapor compression cycle. HVAC systems span a very broad set of systems, ranging from systems which supply only outdoor air to the occupants of a building, to systems which only control the temperature of a building, to systems which control the temperature and humidity.

"Actuators of a vapor compression system" refer to any components of the vapor compression system having an operation controllable by the control systems. The actuators include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor-compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor-compression system.

"Thermodynamic parameters" refer to a set of measurements of physical parameters of the vapor compression system. These parameters include, but are not limited to, temperatures of the air and the refrigerant and pressures of the air and the refrigerant, as well as properties of the refrigerant at various points in the system, such as density, enthalpy, and entropy.

"Set of control inputs" refers to specific values of the inputs for controlling the operation of the components of the vapor compression system. The set of control inputs includes, but are not limited to, values of the speed of the compressor, the position of the expansion valve, the speed of the fan in the evaporator, and the speed of the fan in the condenser.

"Environmental parameters" refer to parameters of the environment effecting or targeted by the operation of the vapor compression system. The environmental parameters include, but are not limited to, indoor and outdoor temperatures, temperature of the air in an inlet and an outlet of both the evaporator and condenser, and the humidity of the air at the evaporator and the condenser.

A "setpoint" refers to a target value the system, such as the vapor compression system, aim to reach and maintain as a result of the operation. The term setpoint is applied to any particular value of a specific set of control inputs and thermodynamic and environmental parameters.

An "extremum seeking" refers to a method having an objective to drive a system so that some signal created by that system is extremized (maximized or minimized). Starting from a given operating point (some nominal input applied to a system that generates some output), a perturbation is added to the input and the system response is measured. Some filtering of the response may optionally be applied in order to extract the part of the output caused by the perturbation. Based on the output response and knowledge of the perturbation, the method increases or decreases the nominal input signal so that the output signal trends in the desired direction. In this manner, the output trends toward the desired direction until the maximum or minimum is reached.

An "extremum seeking controller" refers to a controller configured to execute the extremum seeking.

BRIEF DESCRIPTION OF THE DRAWINGS

FIGS. 4A-E are examples of mapping relationship implemented as lookup tables according to various embodiments;

FIGS. 7A-C are graphs of such convex relationship;

DETAILED DESCRIPTION OF THE EMBODIMENTS OF THE INVENTION

Figure 1:
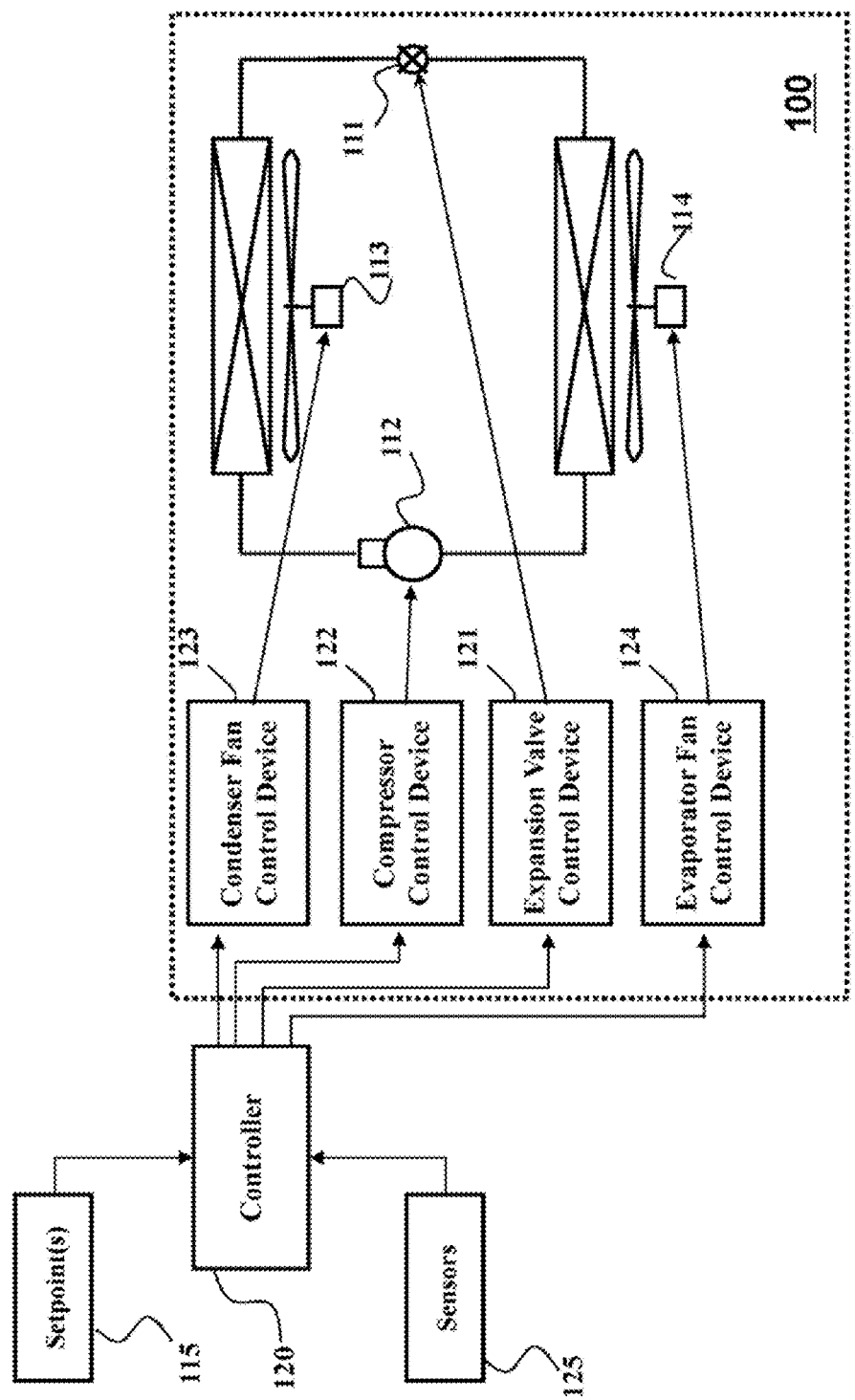
FIG. 1 is a block diagram of a conventional vapor compression system.
Figure 2:
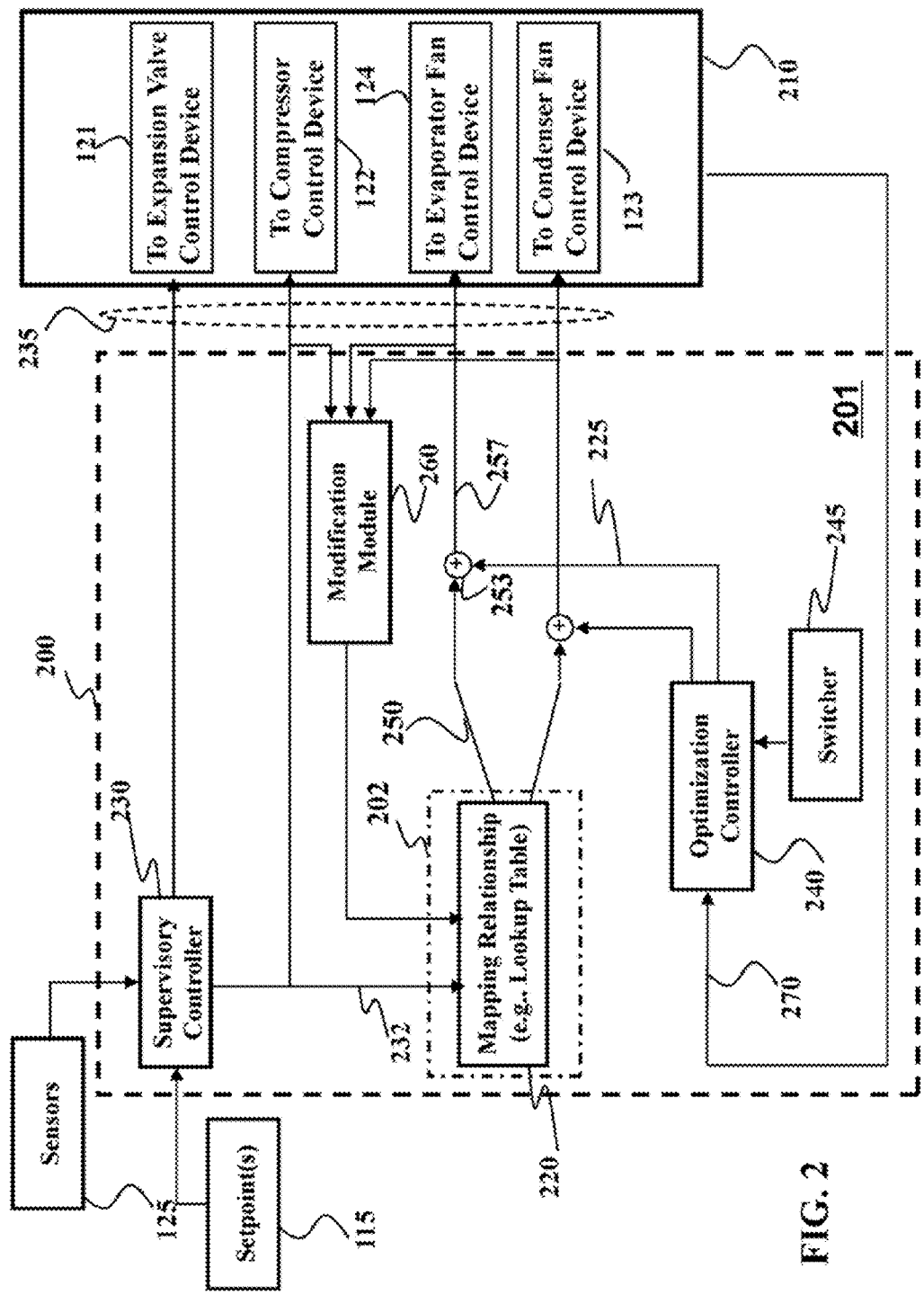
FIG. 2 is a block diagram of a control system for controlling adaptively an operation of a vapor compression system according to some embodiments of invention.

FIG. 2 shows a block diagram of a control system 200 for controlling adaptively an operation of a vapor compression system 210. The vapor compression system 210 can be any type of vapor compression system having variable actuators.

The control system 200 includes a memory 202 for storing a mapping relationship 220 between control inputs of the vapor compression system 210, a processor 201 for executing a supervisory controller 230, and an optimization controller 240. The supervisory controller and the optimization controller can be implemented using hardware, software or combination thereof The supervisory controller 230 controls the operation of the vapor compression system using a set of control inputs 235 selected based on the mapping relationship 220. The mapping relationship can be implemented, e.g., as approximator function for mapping between values of various types of the control inputs, or as a collection of sets of control inputs, e.g., a lookup table, having each set of control inputs associated with a key. In general, the mapping relationship takes at least a key, e.g., a first control input, as an input and outputs at least a second control input.

One of the control inputs generated by the feedback controller can also be used as an input 232 to the mapping relationship 220. This mapping relationship selects, according to the control input generated by the feedback controller, the control inputs for the remaining actuators in the vapor compression system such that the total set of control inputs is optimal according to some metric of performance 270, such as a metric signal representing energy consumption.

One of the control inputs generated by the feedback controller can also be used as an input 232 to the mapping relationship 220. This mapping relationship selects, according to the control input generated by the feedback controller, the control inputs for the remaining actuators in the vapor compression system such that the total set of control inputs is optimal according so some metric of performance 270, such as a metric signal representing energy consumption.

The optimization controller modifies the mapping relationship in response to the operation of the vapor compression system. For example, the optimization controller can modify the mapping relationship based on consumption of energy by the vapor compression system during its operation.

The optimization controller determines an optimal set of control inputs for various thermodynamic conditions. For example, the control system can include a switcher 245 for turning the optimization controller ON and OFF. The switcher can turn on the optimization controller periodically, or on demand. For example, in one embodiment the switcher turns ON the optimization controller in response to reaching a steady state of the operation of the vapor compression system. In another embodiment, the switcher turns the optimization controller ON in response to a metric of performance of the vapor compression system exceeding a threshold.

The control system can also include a modification module 260 for modifying the mapping relationship based on the optimal set of control inputs. For example, the optimization controller can determine a collection of optimal sets of control inputs based on a set of thermodynamic conditions, and the modification module modifies the mapping relationship based on the optimal sets of control inputs.

In some embodiments, the optimization controller includes an extremum seeking controller for modifying the mapping relationship using extremum seeking of a metric of performance of the vapor compression system. In various embodiments, the extremum seeking controller is used to empirically discover the optimal sets of control inputs to modify the mapping relationship. As used herein, modification of the mapping relationship is defined broadly to include populating, updating, removing, adjusting any entries in the mapping relationship, e.g., the entries of the lookup table.

When the optimization controller is switched ON, at least some control inputs 250 determined by the supervisory controller using, e.g., the mapping relationship, are modified 253 by the output 225 of the extremum seeking controller to produce a new control input to the vapor compression system 257. The optimization controller coupled with the supervisory controller sets all control inputs to their optimal values. These optimal values of the system inputs are measured or recorded by the modification module 260 and used to modify the contents of the mapping relationship.

When the optimization controller is switched to OFF, the updated mapping relationship is used by the supervisory controller to rapidly select optimal sets of control inputs.

Supervisory Controller

Figure 3A:
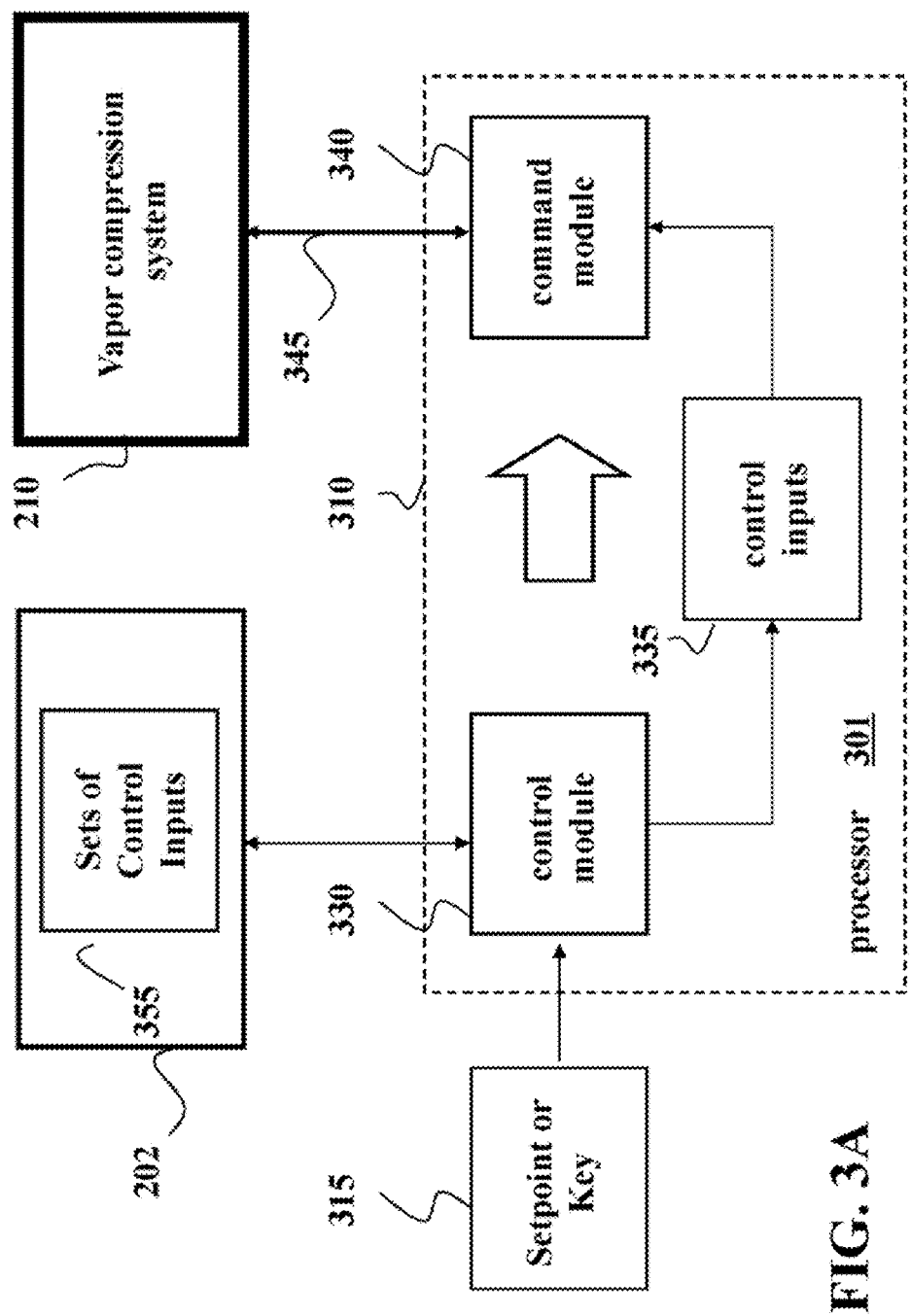
FIGS. 3A-B are block diagrams of various embodiments of a supervisory controller.

FIG. 3A shows a supervisory controller 310 for controlling an operation of a vapor compression system 210 according to one embodiment of the invention. The supervisory controller includes a control module 330 operatively connected to a memory 202 for selecting a set of control inputs 335 from the mapping relationship 220 stored in the memory. In various embodiments, the memory is internal or external to the supervisory controller. The memory can be any computer-readable medium. The supervisory controller further includes a command module 340 operatively connected to the control module for generating a command 345 to operate the system 210 based on the set of control inputs. Various embodiments of the supervisory controller are implemented using a processor 301.

An example of the vapor compression system is a room air-conditioning system, and heating ventilation air-conditioning (HVAC) system. Each control input controls at least one component of the system. Examples of components are compressor, an expansion valve, an evaporator, and a condenser. Similarly, an example of the mapping relationship can be a lookup table storing a collection of optimal sets of control inputs. In an alternative embodiment, the mapping relationship is implemented using a mathematical function, e.g., an approximator function, for mapping control inputs.

FIGS. 4A-E show examples of the lookup tables 410 and 420 for storing the sets of control inputs, such as the set 415. Each set stored in the lookup table is determined to be optimal according to a metric of performance, e.g., the energy consumption of the vapor compression system. Each element u of the sets of control inputs is responsible for the operation of at least one component of the vapor compression system. For example, elements 430 can be responsible for the operation of the compressor, e.g., values of those elements are frequencies of the motor of the compressor. Similarly, elements 440 can be responsible for the operation of the expansion valve, and values of those elements are values of the position of the expansion valve. Also, elements 460 and 470 can be responsible for the operation of the speeds of the evaporator and condenser fans, respectively, and values of those elements are revolutions per minute (rpm) of the fans. Additionally, or alternatively, the lookup table can include artificial keys k 450 to facilitate retrieval of the set of control inputs.

Figures 4A, 4B:
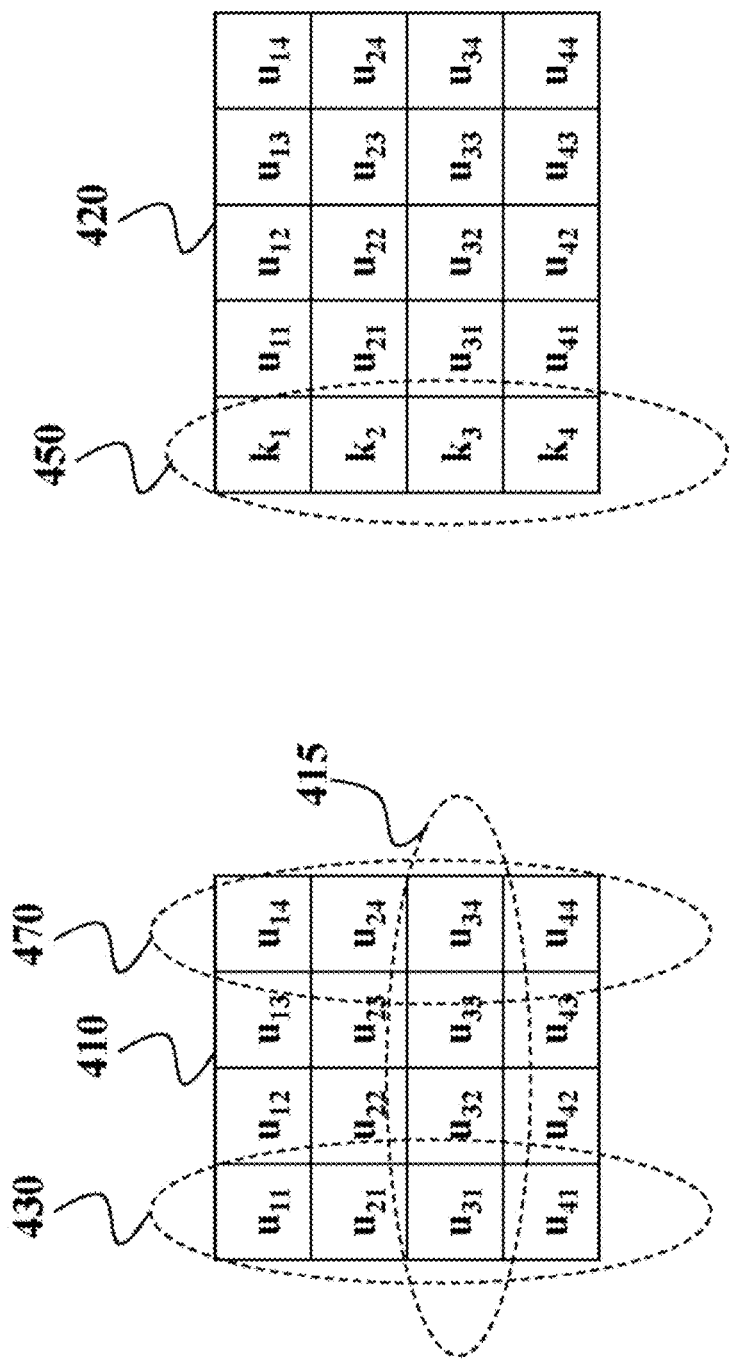
Figure 4C:
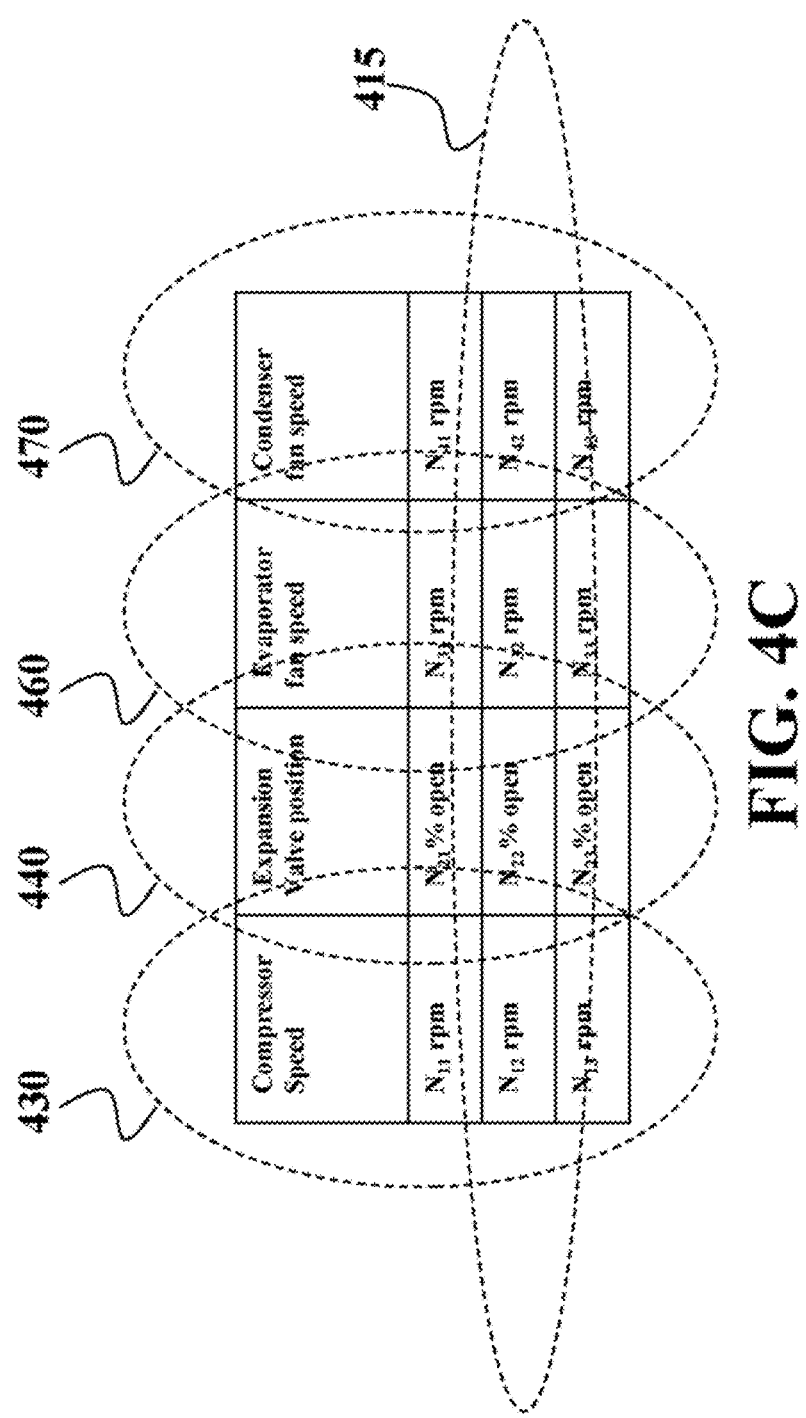

In various embodiments of the invention, the lookup table includes different control inputs and values for the control inputs. FIG. 4C shows an example of the lookup table that includes specific values, illustrated as $N_{sub}$, of control inputs for combinations of the speed of the compressor, the position of the expansion valve, and the speeds for the fans of the evaporator and condenser.

Figure 4D:
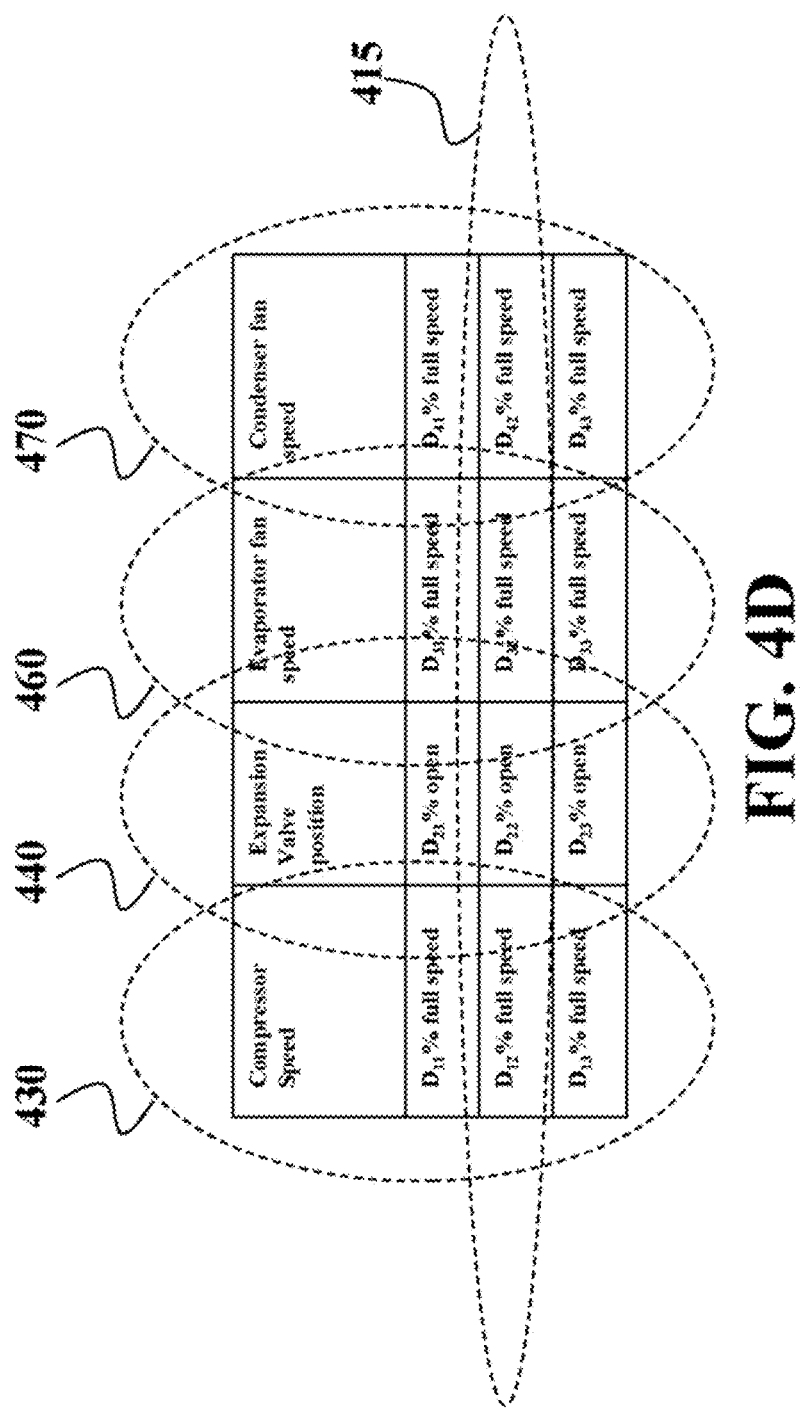

FIG. 4D shows an example of the lookup table that includes full or nominal values as ratios, shown as $D_{sub}$, of the components of the vapor compression system.

Additionally or alternatively, the lookup table can include values for more or less components of the vapor compression system than lookup tables of FIG. 4C-D.

For example, FIG. 4E shows an example of the lookup table that includes values, illustrated as $E_{sub}$, of control inputs for combinations of the speed of the compressor, and the speeds for the fans of the evaporator and condenser. In one variation of this embodiment, the position of the expansion valve is determined separately, e.g., with help of another feedback loop, or provided in an alternative lookup table.

Each set of control inputs corresponds to a particular amount of heat flow and is determined to be the optimal set of control inputs from among the many different sets of control inputs that cause the system to achieve the same amount of the heat flow. For example, a set of control inputs that control the operation of the vapor compression system such that the system consumes the minimal possible amount of energy while achieving a given amount of the heat flow is the optimal set of control inputs from among all possible control input sets that achieve the same amount of the heat flow according to energy efficiency metric. The control module selects the set of control inputs based on a key 315. The key can be any function of a setpoint the system needs to reach as a result of its operation. In some embodiments, the key and corresponding set of control inputs are selected iteratively during the operation of the vapor compression system, until the setpoint is reached.

During the operation, the control module selects the set of control inputs predetermined to be optimal for a particular amount of heat flow and associated with a key corresponding to a particular setpoint. Hence, during the operation, the task of determining the set of control inputs is reduced to the selection of an appropriate set of control inputs from the sets of control inputs determined in advance to be optimal and stored in the memory based on the setpoint.

Thus, the embodiments determine the optimal set of control inputs in real time while minimizing computational complexity during the operation of the system. Moreover, because of the predetermined correspondence between the control values used as keys and the sets of control inputs associated with the keys, the set of control inputs is determined based on the setpoint without determining the amount of heat that the vapor compression system needs to transfer in accordance with that setpoint.

For example, in one embodiment, the key is determined based on the setpoint, and a current value of an outdoor temperature. In another embodiment, the key is determined based on the setpoint, a current value of an outdoor temperature, and a current value of an indoor temperature.

Additionally or alternatively, in one embodiment the key is a function of a value of a control input from the set of control inputs. In one variation of this embodiment, the key is the function of the value of a control input responsible for operation of the compressor of the system.

Figure 3B:
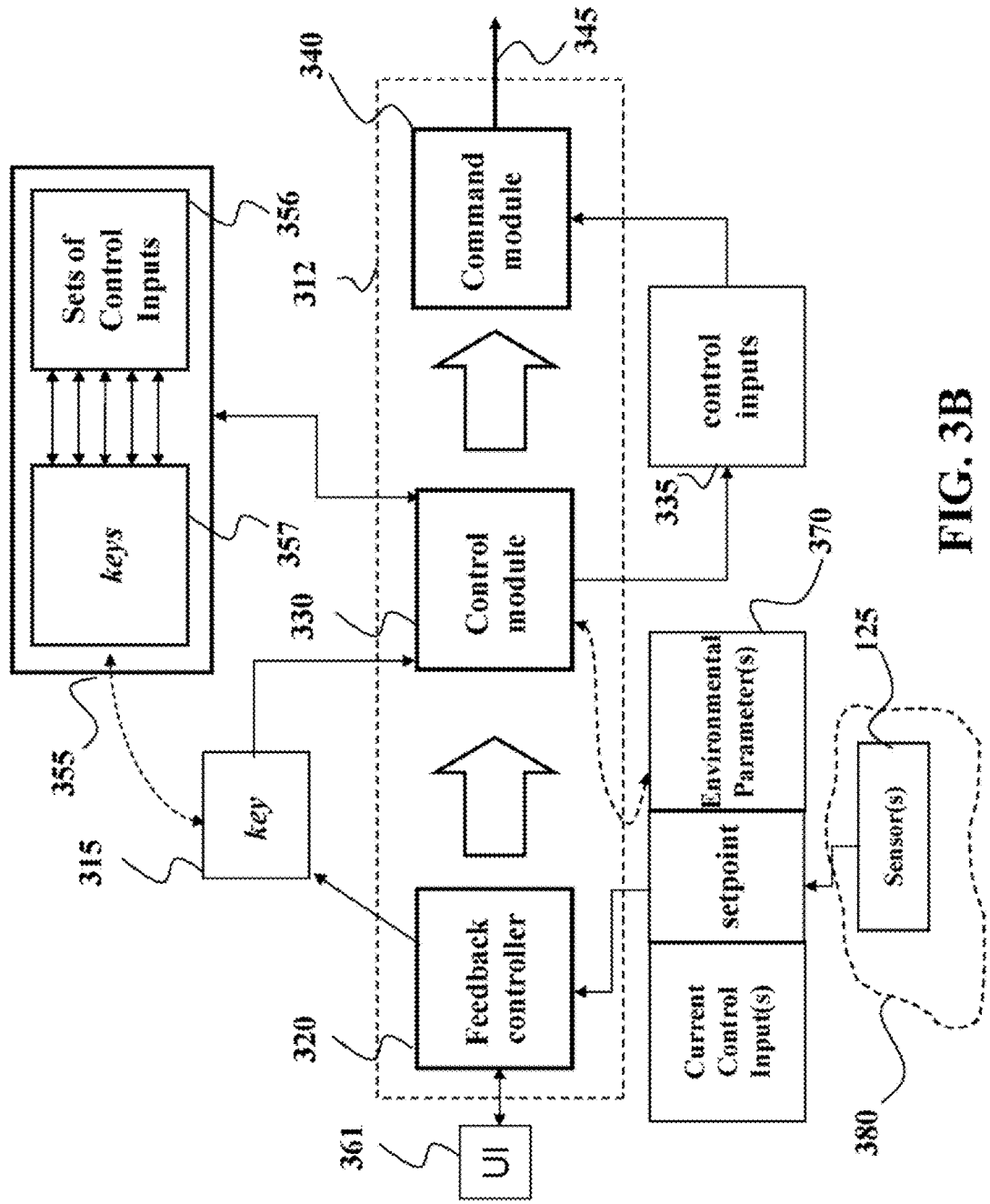

FIG. 3B shows a supervisory controller 312 according to another embodiment of the invention. This embodiment includes a feedback controller 320 for determining the key 315 that is an input to the control module. For example, the sets of the control inputs 355 are stored in the memory in a form of a lookup table having the sets of the control inputs 356 associated with corresponding keys 357. In one embodiment, the keys are at least one element of the sets, e.g., a control input responsible for the operation of the compressor of the vapor compression system. Additionally or alternatively, the keys are defined as an arbitrary function of a particular setpoint.

The feedback controller determines the key based on parameters 370, which include, but are not limited to, at least one of the following: the setpoint, one or more current control inputs, and one or more environmental parameters.

An example of the setpoint is an indoor temperature specified by a user of the system, an example of the environmental parameters is current indoor and outdoor temperatures, and an example of the current control inputs is the current speed of the compressor, the position of an expansion valve, the speed of the evaporator fan, and the speed of the condenser fan.

In various embodiments, the feedback controller is operatively connected to a user input interface 361 for receiving the setpoint, to sensors 125 arranged in environment 380 for sensing current indoor and outdoor temperature, and to the system (not shown) for receiving the current control input parameters. In an alternative embodiment, the feedback controller receives the current input parameters from either control or command modules. Examples of sensors are temperature sensors, such as thermocouple, thermistor, and resistive thermal devices.

Extremum Seeking Controller

In some embodiments, the optimization controller includes an extremum seeking controller. The extremum seeking controller receives an output signal 270 of the vapor compression system representing the performance of the system measured in accordance with the metric of performance. For example, the output signal can represent the energy consumed by the system. The output signal includes a metric signal representing a perturbation in the performance of the system caused by the modification signal. The metric signal can be a sinusoidal signal having a second frequency substantially equal to the first frequency of the perturbation signal.

Figure 5:
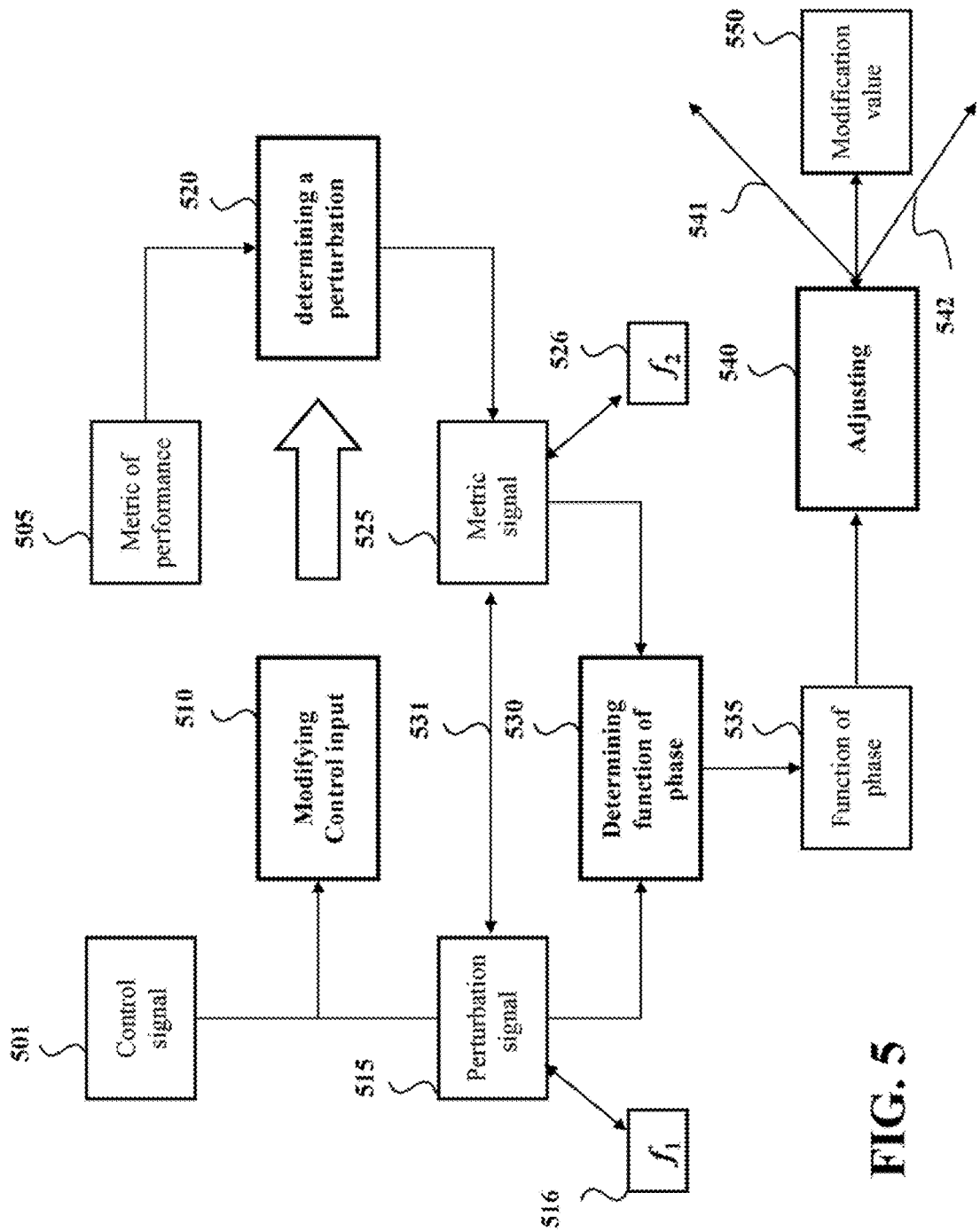
FIG. 5 is a block diagram of a method for adjusting the mapping relationship in accordance with one embodiment.

FIG. 5 shows a block diagram of a method for adjusting the mapping relationship in accordance with one embodiment. The supervisory controller generates a command, e.g., a control signal 501, to control the vapor compression system using the first control input and the second control input.

The extremum seeking controller is turned on and the control signal 501 is modified 510 with the modification signal including a perturbation signal 515 having a first frequency 516. A metric signal 525 representing a perturbation in the performance of the system caused by the modification signal is determined 520, wherein the metric signal has a second frequency 526 substantially equal 531 to the first frequency 515.

Next, the value of the control signal 501 is adjusted 540 based on a function of a phase 535 determined 530 between the perturbation signal and the metric signal. In various embodiments, the function of the phase includes one or combination of a sign of the phase or a shift of the phase. The control signal is adjusted such that the performance is optimized. For example, in one embodiment, the metric of performance is the energy consumption of the system, and thus, the performance should be minimized. In this embodiment, the adjusting includes decreasing 542 the value of the control signal, if the phase is positive; and increasing 541 the value of the control signal, if the phase is negative.

In alternative embodiment, the metric of performance is the efficiency of the system, and the performance should be maximized. In this embodiment, the changing includes increasing 541 the value of the control signal, if the phase is positive; and decreasing 542 the value of the control signal, if the phase is negative. Some embodiments determine a modification value 550 and adjust the mapping relationship based on the modification value. The adjusting can be done, e.g., by the modification module 260.

Figure 6A:
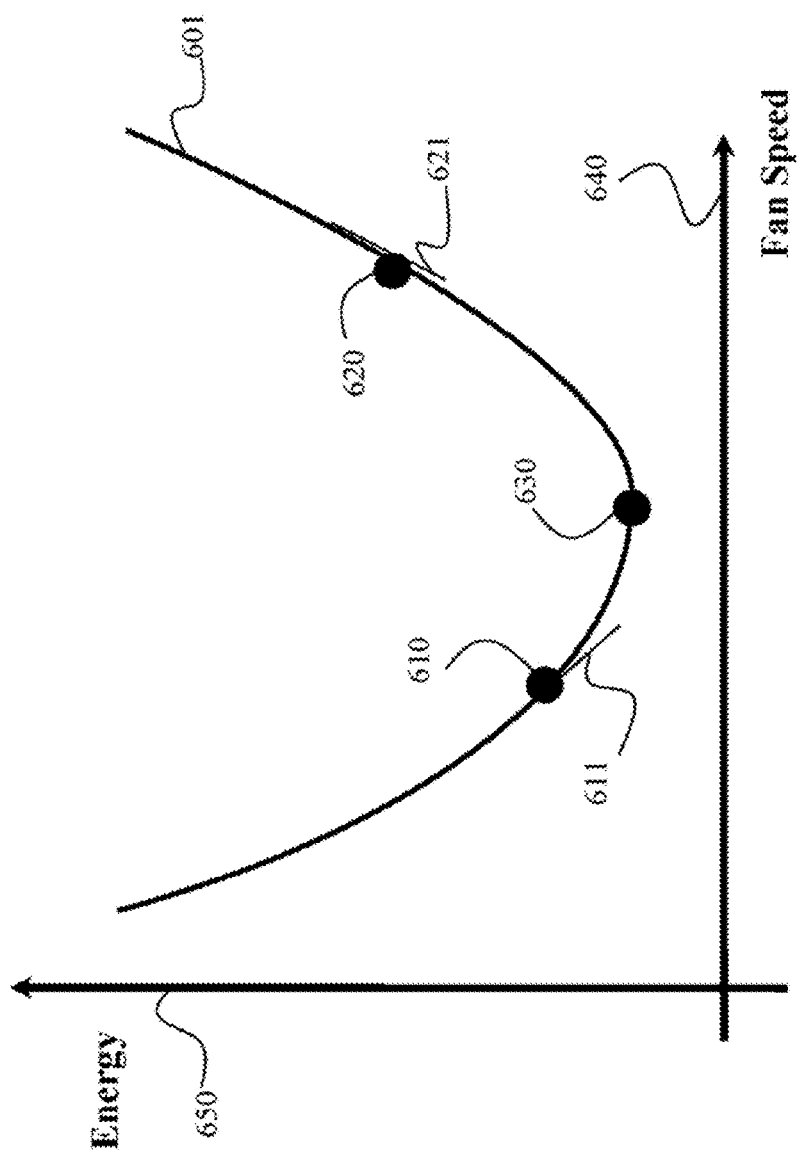
FIGS. 6A-B are graphs of convex relationship between various control inputs an performance of the vapor compression system.

FIG. 6A shows a performance curve 601 of the convex relationship between the operational values of the component, e.g., the speed 640 of the evaporator fan, and the performance, e.g., the energy 650 consumed by the system. For example, a point 630 corresponds to an operating point where current speed of the fan speed is optimal, e.g., the speed of the fan causes the system to operate at minimum energy consumption. A point 610 corresponds to an operating point where the current speed of the fan is lower than the optimal speed, and a point 620 corresponds to an operating point where the current speed of the fan is higher than the optimal speed. In various embodiments, the energy refers to total or overall energy consumed by the entire vapor compression system.

Some embodiments are based on a realization that the slope 611 and a slope 621 can indicate whether the control signal corresponding to the speed of the fan should be decreased or increased to optimize the performance. For example, the slope 611 indicates that that the speed of the fan should be increased in order to minimize the energy. In contrast, the slope 621 indicates that the speed should be decreased.

Figure 6B:
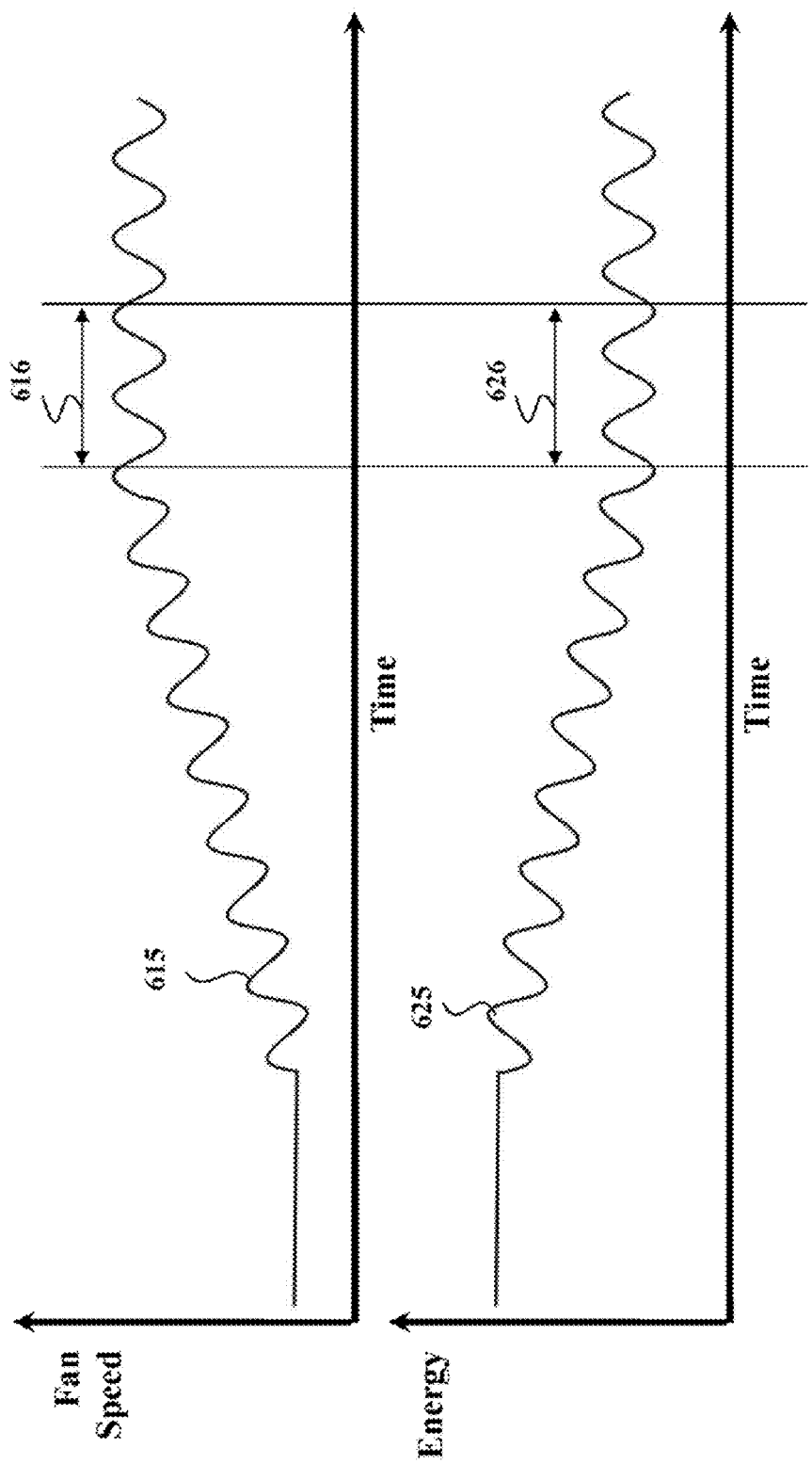

FIG. 6B shows a graph of changes of the control signal corresponding to the speed of the fan and the energy consumed by the system. The control signal is adjusted adaptively over time. Also, the modified control signal and the metric signal are sinusoidal signals, which allow distinguishing between the changes in the performance due to the sinusoidal changes of the control signal from the changes caused by other disturbance, e.g., a change in the heat load. Also, the sinusoidal nature of the signals allows analyzing the convex relationship based on the phase of the sinusoidal signals.

The modification signal s(t) 615 includes a modification value s*, and a perturbation sinusoidal (sin) signal A sin(wt).

$$s(t)=s^*+A\sin(wt).$$

At the beginning of the operation, the modification value can be zero. However, during the operation of the vapor compression system, the modification value enables to optimize the control signal, and the sinusoidal perturbation enables to periodically adjust the modification value to preserve the optimality.

For example, the supervisory controller may command the evaporator fan to rotate at 600 rpm, and the optimization controller may adjust that signal by adding a modification value corresponding to 50 rpm. The optimization controller further adds a sinusoidal perturbation in order to estimate the slope of the curve of the index of performance at the current operating point. In this example, the modified control signal transmitted to the control device, is 650 rpm plus the perturbation signal. The perturbation signal is used to further adjust the modification value 50 rpm in order to drive the system to the optimal operating point.

The rationale of the embodiments and the convex relationship of the sinusoidal signals are further described with help of an example, and with reference to FIGS. 7A-7C. Suppose the vapor compression system is operating in cooling mode (the indoor heat exchanger is an evaporator) and the goal is to regulate the indoor temperature while consuming the minimum possible energy. For the purpose of this example, an initial steady state operating point on the curve is 610, so that the speed of the fan is too low for optimal energy consumption and the indoor room temperature equals the setpoint temperature. A supervisory controller generates N vapor compression system control signals. The N−1 control signals are sent directly to the respective control devices and value of one control signal is modified by the optimization controller.

The optimization controller adds a signal $s_1(t)$ 710 to the control signal, which includes the perturbation signal $A_1 \sin(wt)$ and the modification value $s_1^*$ 720. The sinusoidal perturbation enables estimation of the slope of the curve of the index of performance, as described below.

For example, the initial part of the sinusoidal perturbation signal $s_1(t)$ 710 is increasing, i.e. sin(wt) function started at t=0. The increasing part of the sinusoidal signal causes the speed of the fan to increase, which in turn increases the heat transfer across the evaporator and lower the indoor temperature. The supervisory controller detects this lowered temperature as part of its normal function and commands the compressor to decrease its speed because less cooling is needed to achieve the setpoint temperature.

Because the compressor consumes the largest amount of energy in the vapor compression system, the overall energy consumption is decreased. This decrease is measured as output signal of the performance $V_1(t)$ 730 having phases, i.e., due to the metric signal, opposite of the perturbation signal. Because the phase of $V_1(t)$ 730 is shifted by about 180 degrees as compared to $s_1(t)$ 710, the slope of the curve at the current operating point 610 is negative. The optimization controller uses this slope information to change the modification value $s_1^*$ 720 of the modification signal to cause energy consumption value V1\* 740 to approach its optimal value. The optimization controller continues changing the modification value of the speed of the evaporator fan until a minimum in energy consumption is reached, and the system is operating at point 630. In this manner, the optimization controller saves the energy despite controlling only one control device.

Similarly, if the initial operating point of the vapor compression system is at the point 620 and a sinusoidal perturbation signal $s2(t)$ 750 is applied, the energy response $V2(t)$ 770 is largely in phase with the sinusoidal perturbation, and the optimization controller determines that the slope of the performance curve at the current operating point is positive. Therefore, the optimization controller decreases the modification value of the command input s2\* 760 causing the energy consumed V2\* 780 to decrease, ultimately driving the system to operate at point 630.

In the above describes examples, the metric of performance is energy consumption. Therefore, the object is to minimize the performance. Some embodiments use different metric of performance, e.g., an efficiency of the system. Those embodiments modify the optimization controller to maximize the performance.

Figure 8:
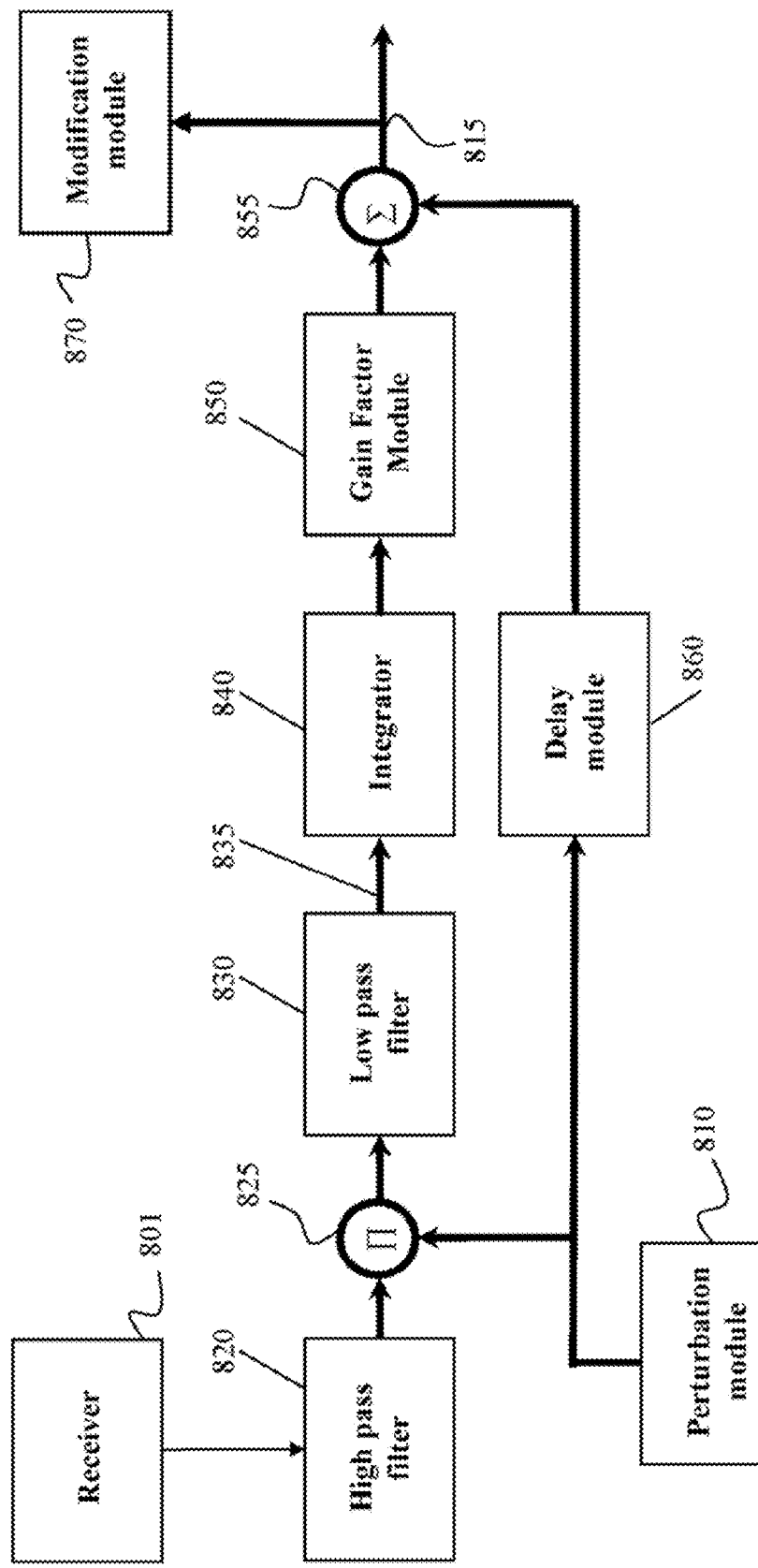
FIG. 8 is a block diagram of an extremum seeking controller according to one embodiment of the invention.
Figure 9:
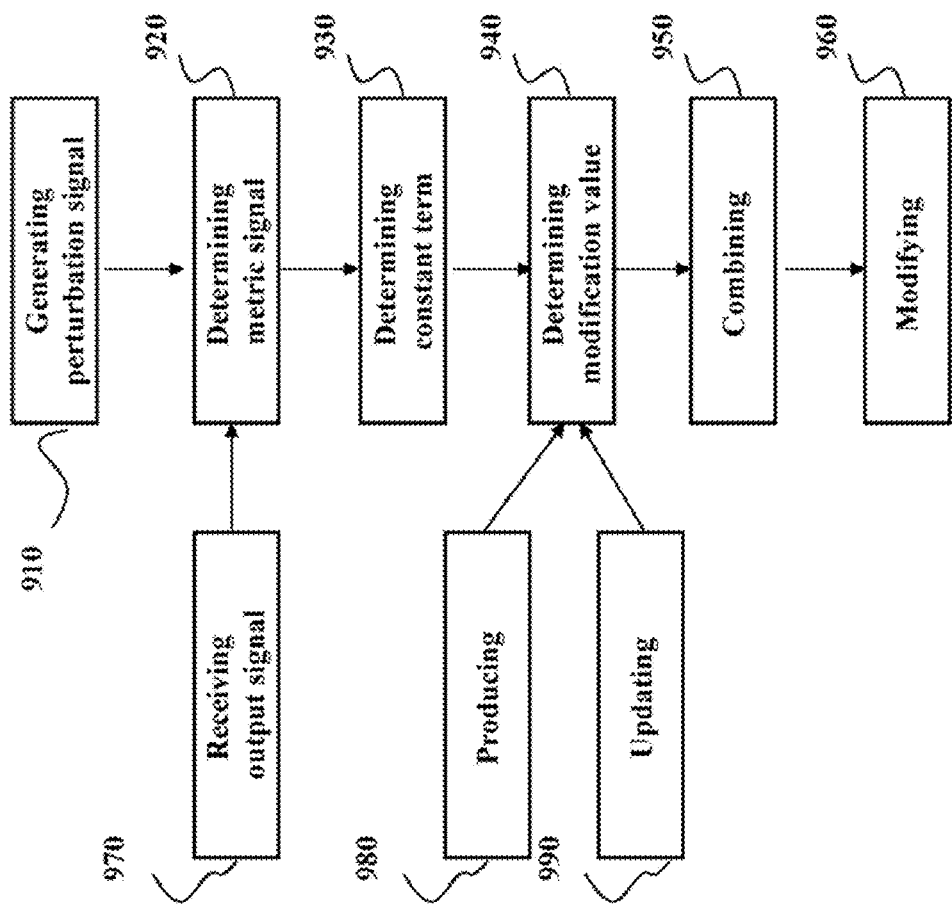
FIG. 9 is a flow chart of a method of operation of the extremum seeking controller of FIG. 8.

FIG. 8 shows an extremum seeking controller 800 according to one embodiment of the invention. FIG. 9 shows a flow chart of method of operation of the optimization controller 800. FIGS. 8-9 are provided for illustration purpose only, and are not indented to limit the scope of the invention. In various embodiments, the configuration of the optimization controller includes one or some of the described components.

The optimization controller can include one or some of the following components. A perturbation module 810 for generating 910 a perturbation signal 515, and a receiver 801 for receiving 970 or measuring the output signal 270 of the vapor compression system representing the performance in accordance with the metric of performance. During the operation, the output signal V(t) includes the metric signal B sin(wt) 525 in addition to a nominal value V*.

The optimization controller can include a high-pass filter 820 for determining 920 a metric signal in response to receiving the output signal, and a low-pass filter 830 for determining 930 a constant term of a product 825 of the perturbation signal and the metric signal. The high-pass filter is designed to remove the nominal value V* from the output signal and to produce the metric signal. The metric signal may include other high frequency components originating from other sources such as noise. The metric signal has the same frequency as the perturbation signal and when two sinusoids of the same frequency are multiplied, the resulting expression has a constant term and a sinusoidal term according to $$\sin(wt)*B\sin(wt)=B/2-B/2*\cos(2wt).$$

The function of phase, and the slope of the performance curve, is encoded in the constant term B/2. If both sinusoidal signals are in phase (as with $s_2(t)$ 750 and $V_2(t)$ 770 in FIG. 7), then the constant term is positive. However, if the slope of the performance curve at the current operating point is negative, then the two sinusoids are out of phase (as with $s_1(t)$ 710 and $V_1(t)$ 730 in FIG. 7) and the right side of the above equation has a negative constant term. The optimization controller can use the sign of the constant term B/2 to determine the slope of the performance curve.

Because, in one embodiment, only the constant term the B/2 term is required, the sinusoidal term with twice the perturbation frequency is removed using a low-pass filter 830. The optimization controller can include an integrator 840 for determining 940 the modification value 550 based on a sign of the constant term 835.

The sign of the constant term indicates if the current modification value s* is too large or too small compared to the value of s that optimizes the value V of the control signal. The integrator 840 integrates the constant term B/2 in to determine the modification value based on the slope information. In various embodiments, the integrator produces 980 new value of the modification value, or updates 990 a previous value of the modification value.

The optimization controller can also include a gain factor module 850 for multiplying the modification value by a gain factor, wherein a sign of the gain factor depends on the metric of performance. Usually, the multiplication by the gain factor serves two goals.

First, the gain factor determines the speed at which the optimization controller reacts to changes in the slope. For example, a low magnitude of the gain factor causes slow changes to the value of the control signal.

Second, the sign of the gain factor determines whether the optimization controller maximizes or minimizes the index of performance. In the embodiments where the performance, such as the energy consumption, has to be minimized, the sign of gain factor K is negative. When the gain factor K is negative and the constant term is negative then the value of the control signal is increased. This is consistent with searching for a minimum in the performance curve. In the embodiments where the performance has to be maximized, the gain factor K is positive. The gain factor module simplifies adaptation of the optimization controller for different objectives of the vapor compression system.

The optimization controller can also include an summation module 855 for combining 950 the modification value with the perturbation signal to output the modification signal 815 suitable for modifying 960 the control signal of at least one component of the system, such that the performance is optimized. Some embodiments also include a modification module for modifying the control signal with the modification signal.

In some embodiments, the optimization controller also includes a delay module 860 to accept the perturbation signal. The delay module compensates for delay induced by the dynamics of the vapor compression system. Typically, the delay module is not required if the frequency of the perturbation signal is substantially slower than the dominant dynamics of the vapor compression system.

According to various embodiments, the combination of the supervisory and optimization controllers can be used for self calibration and diagnosis procedure of the vapor compression system, e.g., as part of the development of a new system configuration or new model lines, as part of the installation or commissioning process, or repeated periodically in the field to account for changes in the equipment performance over time. Similarly, the self calibration procedure can catch control inputs that exceed some predetermined limits, and operate the system in a protection mode or notify the user to service the system.

Figure 10:
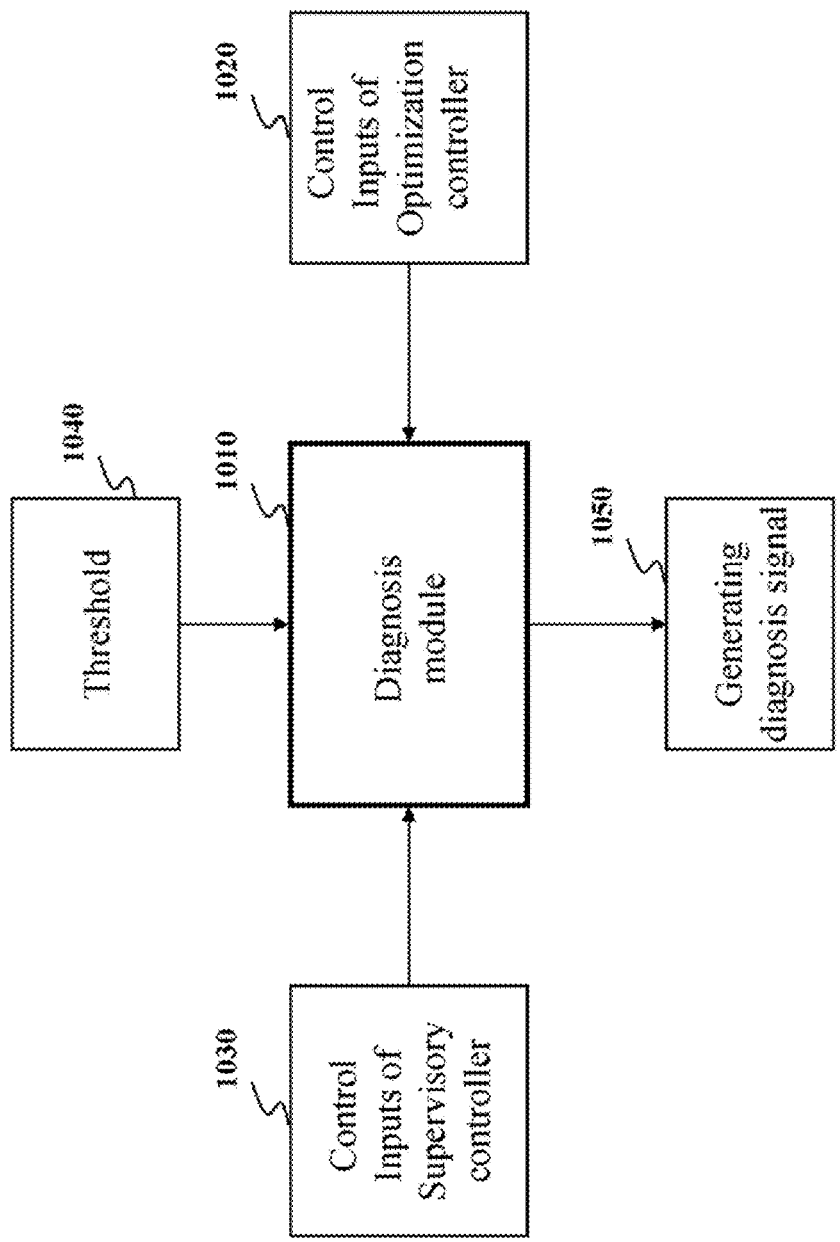
FIG. 10 is a block diagram of a diagnosis module according to one embodiment of the invention.

FIG. 10 shows a block diagram of a diagnosis module 1010 that can be used for diagnosis and/or self calibration purposes. For example, the diagnosis module can detect a difference between the control inputs 1030 stored in the mapping relationship used by the supervisory controller and corresponding control inputs 1020 determined by the optimization controller and for generating a diagnosis signal 1050 if the difference is above a threshold 1040.

Factory Test Chamber Operations

Various embodiments of the invention are used to create a mapping relationship for particular vapor compression system, e.g., to populate a lookup table with sets of control inputs optimizing the energy consumption of the system. In some of those embodiments, the lookup table is modified under controlled conditions such as in a factory test chamber.

Figure 11:
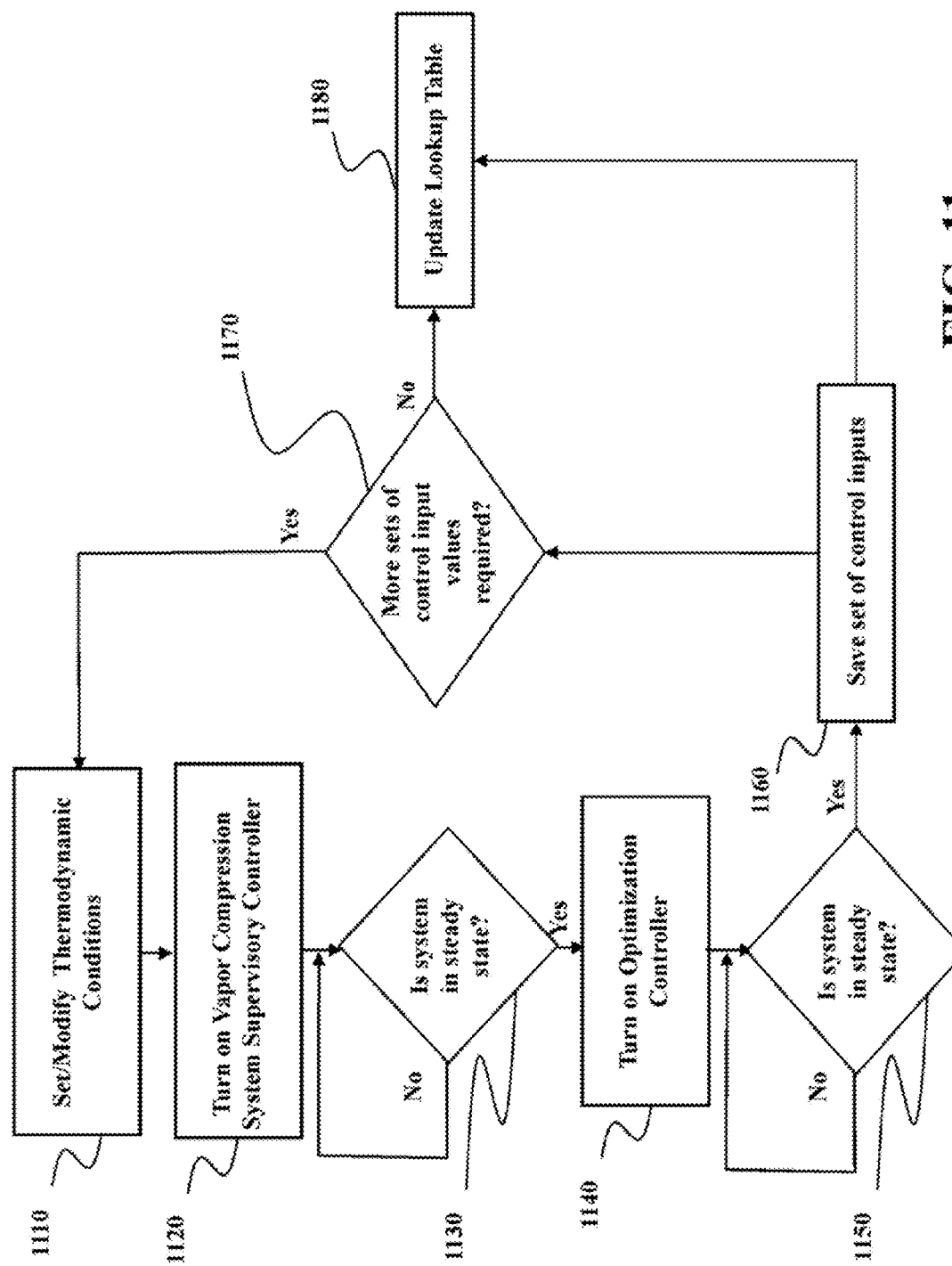
FIGS. 11-12 are block diagrams of methods for operating the vapor compression system according to various embodiments of the invention.

FIG. 11 shows a block diagram of a method for operating the vapor compression system under some thermodynamic operating conditions (a particular heat load, indoor and outdoor air temperatures). In a controlled environment, such as a factory test chamber, these conditions may be able to be specified 1110. After the external conditions are set, the vapor compression system supervisory controller is turned ON 1120. The supervisory controller can include a feedback controller that drives errors signals to zero, such that the indoor air temperature is driven to the setpoint temperature, which ensures that the heat load is rejected in the steady state. The system operates in this configuration until the steady state is achieved 1130. This determination can be made by measuring signals of interest such as temperatures and waiting, until signals do not substantially vary over time.

Figure 13:
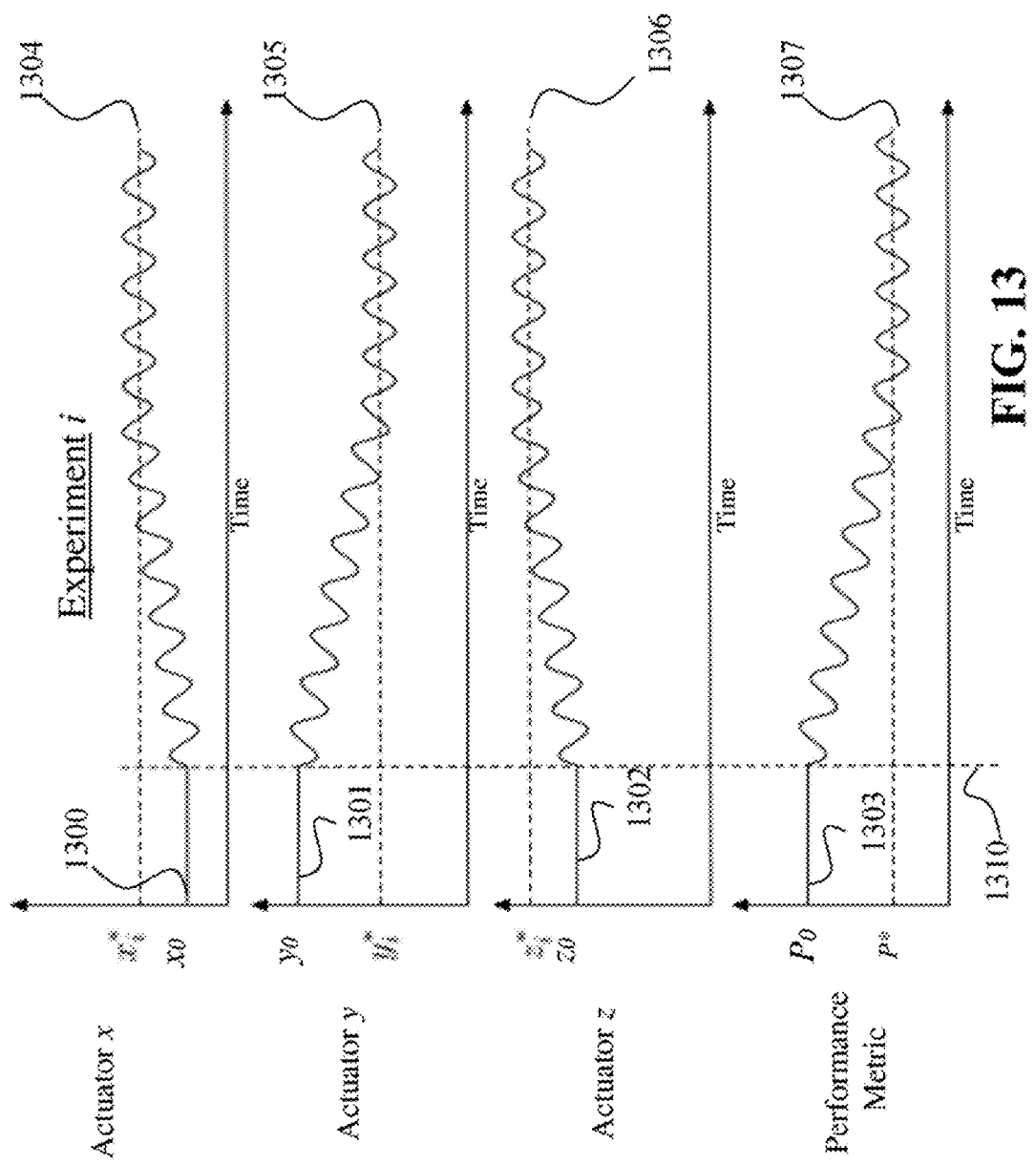
FIG. 13 is a schematic of signals generated by the optimization controller according to various embodiments of the invention.

Next, the optimization controller is switched ON 1140, which adds a perturbation to some of the commanded system actuators, as shown in FIG. 13. The optimizing controller sets the actuators to values that optimize the metric signal. After some period of time, the system is determined to be in the steady state 1150, and all of the vapor compression system inputs have converged to their optimal operating points.

FIG. 13 graphically shows the signals representing the actuator commands generated by the optimization controller and the metric signal measured by the optimization controller as functions of time. Before the optimization controller is switched ON, the actuators are at their initial values. For example, an actuator x may have an initial value of $x_0$ 1300, an actuator y may begin at an initial value of $y_0$ 1301, and an actuator z may begin at an initial value of $z_0$ 1302. The performance metric has an initial value of P0 1303. The optimization controller is switched on at a point of time 1310 and a sinusoidal perturbation is added to the commands of the actuators. This perturbation on the actuators causes a similar sinusoidal response on the metric signal. The optimization compares the phase of the sinusoids between the actuator commands and the response of the metric signal in order to estimate the slope of the performance curve (e.g., 611 of FIG. 6A).

In some embodiments, the perturbation signal is selected such that the response of the sinusoidal perturbation is not influenced by the vapor compression system dynamics, and therefore the frequency of the perturbation is kept slow. The need for a slow perturbation signal is the reason why the energy optimizing controller takes a long time to converge.

After some time, the signal representing the metric of performance reaches a steady state 1307, the actuators converge to perturbations around their optimal values. For example, actuator x converges to a sinusoidal perturbation around the value that optimizes the metric, noted as x* 1304. Similarly, other actuators y converges around value 1305, and the actuator z converges around a value 1306.

The abovementioned process is performed for a particular single thermodynamic operating condition and corresponds only to one entry line in the lookup table. Therefore, in some embodiments, multiple experiments are performed to sufficiently update the lookup table. If another experiment should be performed 1170, then the thermodynamic conditions are modified and the process described above is repeated until the lookup table is updated 1180.

Some other embodiments operate in an unstructured environment, such as a residence of a customer. In these embodiments, the thermodynamic conditions are not directly controlled. Instead, modifications to the lookup table can occur periodically under the natural change of thermodynamic conditions.

For example, if the vapor compression system installed in the residence does not experience the full thermodynamic conditions that could have been used to test the full lookup table, then only the relevant parts of the lookup table may be updated when the lookup table modification system is employed. However, because this range of thermodynamic conditions represents the most common conditions experienced by the vapor compression machine of the customer, optimal performance is maintained even as the system ages.

Figure 12:
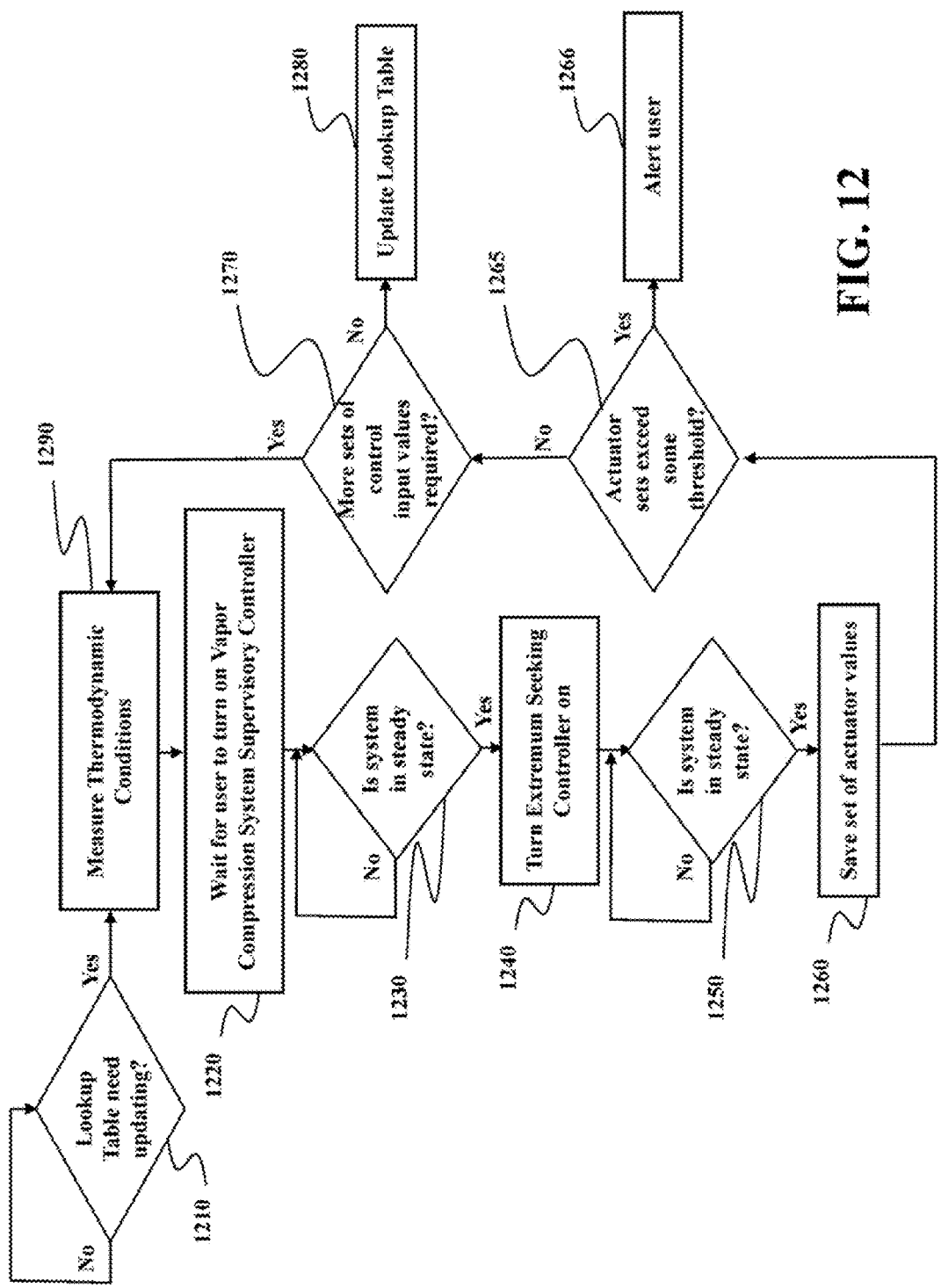

FIG. 12 shows a method for modifying the lookup table in the unstructured operating environment. The need to modify the lookup table is determined 1210, based on criteria such as the time interval since the last update, the absolute time or date (e.g., on June 1st at noon), or if the performance metric has exceeded some predetermined value. After it has been determined that a lookup table is to be updated, the current thermodynamic conditions are measured 1290 and the system waits until the user turns on the vapor compression system (if the system is not otherwise on). The system waits until steady state conditions have been reached 1230 and the switcher turns on 1240 the optimization controller. The system waits until steady state has been reached 1250 and then saves 1260 the set of control input values for this steady state.

For another experiment to be performed 1270, the system waits until the natural thermodynamic conditions have sufficiently varied (for example, the system may wait until the outdoor air temperature varies by 5 degrees and the indoor air temperature varies by 3 degrees since the last time the optimization controller was switched on). After these thermodynamic conditions are met, the abovementioned method is repeated. The lookup table us updated 1280 either periodically after each set of control inputs is determined or after determining a sufficient number of experiments have been performed Additionally, in one embodiment, if the optimization controller converges to control input values in the field that exceed 1265 some predetermined threshold, then a warning or alarm signal may be issued 1266 to the user alerting them to service the vapor compression machine. In this manner, the above invention enables self-monitoring and fault detection in an inexpensive manner.

Lookup Table Modification Process

After N experiments have been performed, the resulting N sets of optimal actuator values are determined, i.e., each set includes control inputs for the system actuators: $\{x_i^*, y_i^*, z_i^*\}$ for i=1 to N). In some embodiments, these values are used to determine modified mapping relationship between a first control input serving as a key (input) of the lookup table and at least a second control input, i.e., the outputs of the lookup table. This mapping relationship can be plotted as shown in FIGS. 14A-D.

Figure 14:
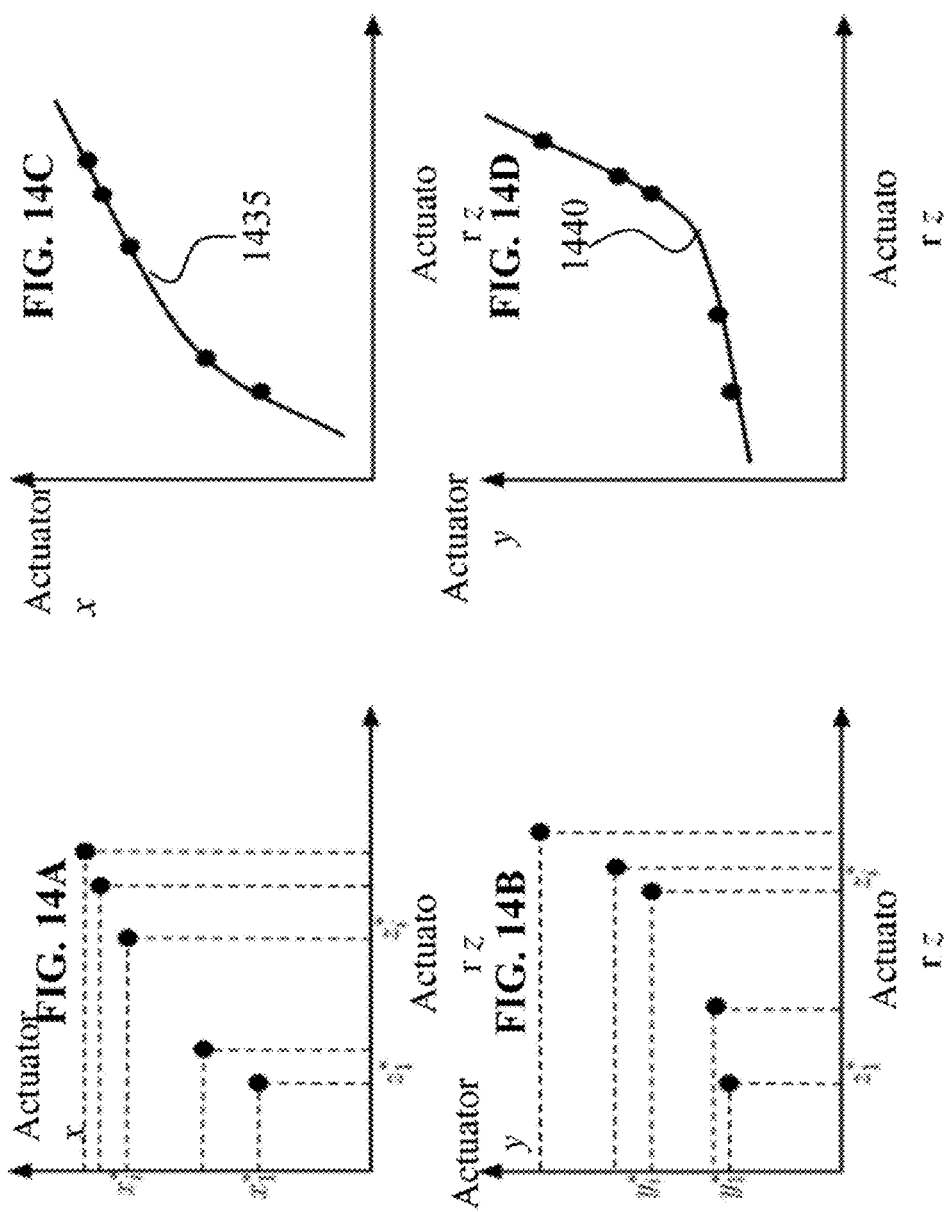
FIGS. 14A-D are graphs illustrating optimal combinations of control inputs and corresponding outputs.

In FIG. 14A, the optimal values of x actuator positions are plotted against the optimal values of z actuator positions for the N experiments, and in FIG. 14B, the optimal values of y actuator positions are plotted against the optimal values of z actuator positions for the N experiments. From these data points, a function 1435 can be fit that outputs the optimal x actuator position given the z actuator position ($x=f_1(z)$), as shown in FIG. 14C. Similarly, a function 1440 that outputs the y actuator position given the z actuator position ($y=f_2(z)$), as shown in FIG. 14D.

Figure 15:
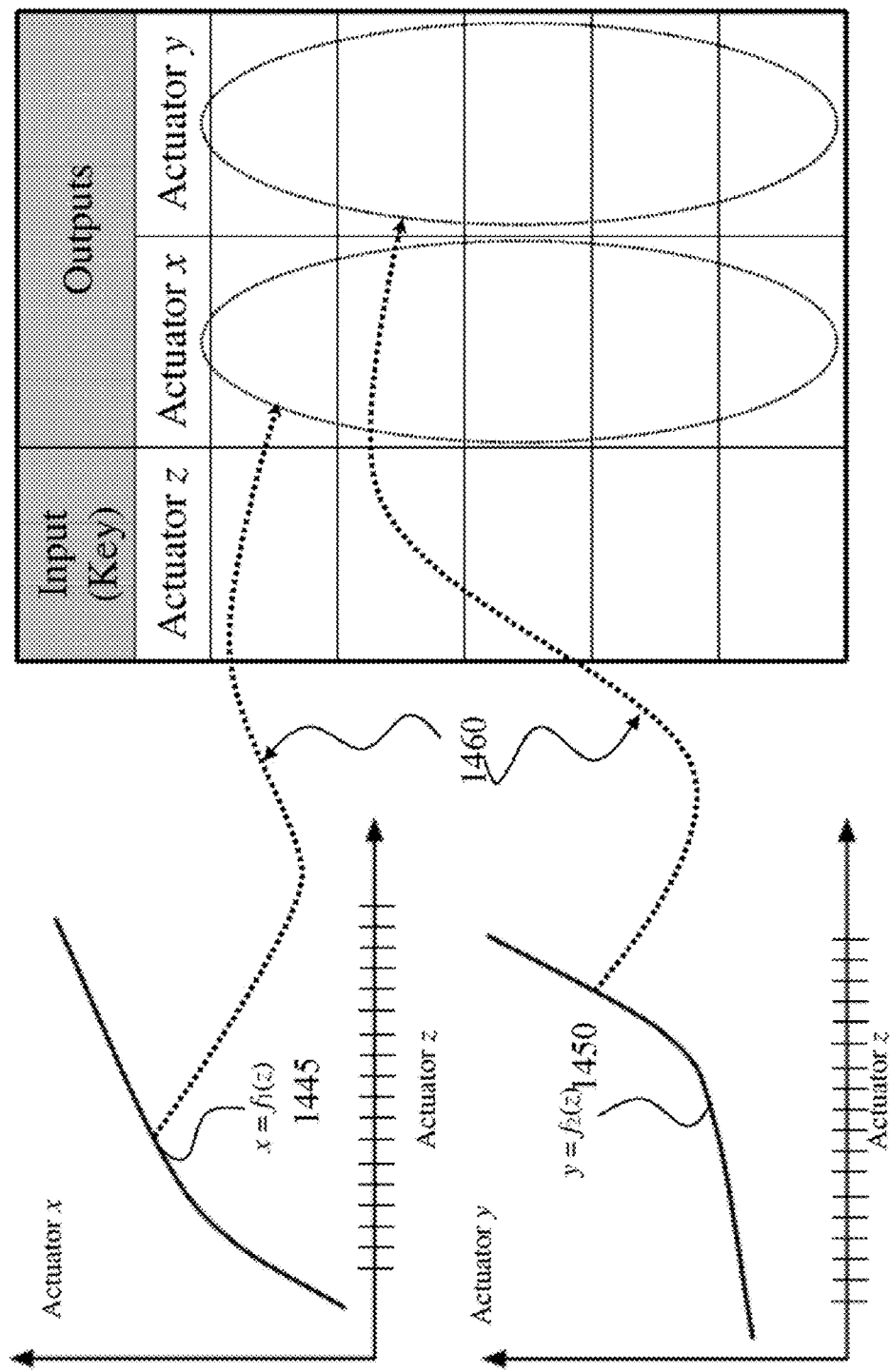
FIG. 15 is a schematic of modification of the mapping relationship based on the optimal combinations of FIGS. 14A-B.

In some embodiments of the invention, these functions may be used directly in place of the lookup table in the supervisory controller. In other embodiments that include a lookup table, these functions may be used to modify the entries in the table. FIG. 15 shows that the functions $x=f_1(z)$ 1445 and $y=f_2(z)$ 1450 are resampled 1460, in one embodiment, at values of z that appear in the lookup table in order to provide modified values for the appropriate row.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A control system for adaptively controlling an operation of a vapor compression system, comprising:
a memory configured to store a mapping relationship between control inputs of the vapor compression system, wherein the mapping relationship maps values of at least a first control input to values of at least a second control input, such that a value of the first control input defines a value of the second control input forming a set of control inputs, wherein the first control input and the second control input are one of a value of a speed of a compressor, a value of a position of an expansion valve, a value of a speed of an evaporator fan and a value of a speed of a condenser fan; and
a processor configured to execute a supervisory controller and an optimization controller, wherein
the supervisory controller is configured to control the operation of the vapor compression system using the set of control inputs selected according to the mapping relationship, wherein the supervisory controller is a model-free controller controlling the operation without using a model of the vapor compression system, and wherein
the optimization controller is configured to modify the mapping relationship in response to the operation of the vapor compression system, wherein the optimization controller is a model-free controller modifying the mapping relationship without using the model of the vapor compression system.

2. The control system of claim 1, wherein the optimization controller comprises:
an extremum seeking controller for modifying the mapping relationship using extremum seeking of a metric of performance of the vapor compression system.

3. The control system of claim 1, wherein the supervisory controller comprises:
a feedback controller for determining the value of the first control input;
a control module for selecting the value of the second control input based on the mapping relationship between the values of first control input and the values of second control input; and
a command module for generating a command to control the vapor compression system using the value of the first control input and the value of the second control input.

4. The control system of claim 1, wherein the supervisory controller comprises:
a feedback controller for determining a control value based on an output of the operation of the vapor compression system and a setpoint for the operation of the vapor compression system;
a control module for selecting, based on a function of the control value, at least a subset of the set of control inputs from the mapping relationship; and
a command module for generating a command to operate the vapor compression system based on the set of control inputs formed by at least the subset of control inputs.

5. The control system of claim 4, wherein the control value is a control input for controlling a speed of a compressor of the vapor compression system, and wherein the command module combines the control input with the subset of controls inputs to form the set of control inputs.

6. The control system of claim 4, wherein the mapping relationship includes a collection of sets of control inputs, each set of control inputs is associated with a key, wherein the feedback controller determines the key based on an output of the operation of the vapor compression system.

7. The control system of claim 4, wherein the mapping relationship includes an approximator function for mapping a control input determined by the feedback controller to the subset of control inputs.

8. The control system of claim 1, wherein the mapping relationship is constructed to optimize the operation of the vapor compression system.

9. The control system of claim 2, wherein the optimization controller determines an optimal set of control inputs for a particular thermodynamic condition, wherein the control system further comprises:
a modification module for modifying the mapping relationship based on the optimal set of control inputs.

10. The control system of claim 9, wherein the optimization controller determines a collection of optimal sets of control inputs based on a set of thermodynamic conditions, and wherein the modification module modifies the mapping relationship based on the optimal sets of control inputs.

11. The control system of claim 1, further comprising:
a switcher for turning the optimization controller ON and OFF.

12. The control system of claim 11, wherein the switcher turns ON the optimization controller in response to reaching a steady state of the operation of the vapor compression system.

13. The control system of claim 11, wherein the switcher turns the optimization controller ON in response to a metric of performance of the vapor compression system exceeding a threshold.

14. The control system of claim 1, further comprising:
a diagnosis module for detecting a difference between the control inputs stored in the mapping relationship and corresponding control inputs determined by the optimization controller and for generating a diagnosis signal if the difference is above a threshold.

15. The control system of claim 2, wherein the extremum seeking controller adjusts a value of a control input in a set of control inputs based on a phase between a perturbation signal and a metric signal representing the metric of performance to produce an optimal set of control inputs.

16. A vapor compression system, comprising:
an evaporator having a fan for adjusting an air-flow rate through a heat exchanger, wherein the fan is variable speed fan controlled by an evaporator fan control device;
a condenser having a fan for adjusting the air-flow rate through the heat exchanger, wherein the fan is variable speed fan controlled by a condenser fan control device;
a compressor having a speed for compressing and pumping refrigerant through the system, wherein the speed of the compressor is variable and controlled by a compressor control device;
an expansion valve for providing an adjustable pressure drop between a high-pressure portion and a low-pressure portion of the vapor compression system, wherein the expansion valve is controlled by an expansion valve control device;
a memory configured to store a mapping relationship between control inputs of the vapor compression system, wherein the mapping relationship maps values of at least a first control input to values of at least a second control input, such that a value of the first control input defines a value of the second control input forming a set of control inputs, wherein the first control input and the second control input are one of a value of the speed of the compressor, a value of a position of the expansion valve, a value of the speed of the evaporator fan and a value of the speed of the condenser fan;
a supervisory controller configured to control an operation of the vapor compression system using a set of control inputs determined based on the value of the first control input and the mapping relationship between the control inputs of the vapor compression system, wherein the set of control inputs includes corresponding control inputs for controlling the evaporator fan control device, the condenser fan control device, the compressor control device, and the expansion valve control device, and, wherein the supervisory controller is a model-free controller determining the set of control inputs without using a model of the vapor compression system; and
an extremum seeking controller for modifying the mapping relationship using extremum seeking of a metric of performance of the vapor compression system.

17. The vapor compression system of claim 16, further comprising:
a switcher for turning the extremum seeking controller ON and OFF.

18. The vapor compression system of claim 16, wherein the controller and the extremum seeking controller are implemented using a processor.

19. A method for controlling an operation of a vapor compression system without using a model of the vapor compression system, comprising steps of:
determining a value of a first control input based on the operation of the vapor compression system;
selecting, based on the value of the first control input, a value of a second control input from a memory storing a mapping relationship between control inputs of the vapor compression system, wherein the mapping relationship maps values of at least the first control input to values of at least the second control input, such that the value of the first control input defines the value of the second control input, wherein the first control input and the second control input are one of a value of a speed of a compressor, a value of a position of an expansion valve, a value of a speed of an evaporator fan and a value of a speed of a condenser fan;
determining a modification value optimizing a performance of the vapor compression system operated based on the first control input and the second control input; and
adjusting the mapping relationship based on the modification value, wherein the steps of the method are performed by the processor.

20. The method of claim 19, wherein the modification value is determined using an extremum seeking of a metric of performance of the vapor compression system.

* * * * *